(12) United States Patent
Kumar Agrawal et al.

(10) Patent No.: US 11,907,606 B1
(45) Date of Patent: Feb. 20, 2024

(54) COMPUTE BOX AND CORRESPONDING SYSTEMS AND METHODS FOR FORMATTING CONTENT FOR PRESENTATION ON FLEXIBLE CONTENT PRESENTATION COMPANION DEVICES

(71) Applicant: Motorola Mobility LLC, Chicago, IL (US)

(72) Inventors: Amit Kumar Agrawal, Bangalore (IN); Rohit Sisodia, Naperville, IL (US); Sanjay Dhar, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/121,957

(22) Filed: Mar. 15, 2023

(51) Int. Cl.
G06F 3/14 (2006.01)
G06F 1/16 (2006.01)

(52) U.S. Cl.
CPC .......... G06F 3/1454 (2013.01); G06F 1/1652 (2013.01)

(58) Field of Classification Search
CPC .............................. G06F 3/1454; G06F 1/1652
See application file for complete search history.

(56) References Cited

U.S. PATENT DOCUMENTS

| | | | |
|---|---|---|---|
| 8,407,347 B2 | 3/2013 | Zhang et al. | |
| 9,483,752 B1 | 11/2016 | Raju et al. | |
| 10,609,192 B1 * | 3/2020 | Kumar Agrawal | ......................... H04M 1/72403 |
| 10,650,790 B2 * | 5/2020 | Maalouf | ................ G06F 3/1423 |
| 11,509,760 B1 * | 11/2022 | Kumar Agrawal | ... G06F 1/1647 |
| 2014/0002430 A1 | 1/2014 | Kwack | |
| 2014/0028596 A1 | 1/2014 | Seo | |
| 2014/0101560 A1 | 4/2014 | Kwak | |
| 2014/0129948 A1 * | 5/2014 | Jones | ..................... G06F 3/0484 715/733 |
| 2014/0215201 A1 * | 7/2014 | Pfeifer | ..................... G06F 9/441 713/100 |
| 2015/0338888 A1 * | 11/2015 | Kim | ...................... G06F 1/1643 345/156 |
| 2017/0322597 A1 * | 11/2017 | Lee | ........................ G06F 1/1615 |
| 2020/0177714 A1 * | 6/2020 | Jung | ................. H04M 1/72415 |

(Continued)

OTHER PUBLICATIONS

Yang, Nan-Ying, "Non-Final Office Action", U.S. Appl. No. 18/121,948; Filed Mar. 15, 2023; dated Nov. 14, 2023.

*Primary Examiner* — Ariel A Balaoing
(74) *Attorney, Agent, or Firm* — Philip H. Burrus, IV

(57) ABSTRACT

A compute box includes a communication device and one or more processors. The one or more processors, in response to the communication device being electronically in communication with a flexible content presentation companion device and at least one other flexible content presentation companion device, determine a geometric configuration of each flexible content presentation companion device. The one or more processors format content for presentation on the visible area available on the flexible content presentation companion device and another visible area of another flexible content presentation companion device and cause the communication device to deliver the content to each flexible content presentation companion device. When the geometric configuration of any flexible content presentation companion device changes, the one or more processors can generate a visible display area adjustment animation to smoothly transfer the content to a new visible area.

20 Claims, 13 Drawing Sheets

(56) References Cited

U.S. PATENT DOCUMENTS

| | | | | |
|---|---|---|---|---|
| 2020/0293262 A1* | 9/2020 | Lee | ............ | G06F 1/1641 |
| 2021/0135492 A1 | 5/2021 | Kim | | |
| 2022/0269387 A1* | 8/2022 | Gao | ............ | G06F 1/1616 |
| 2022/0391161 A1* | 12/2022 | Fan | ............ | G06F 3/1423 |
| 2023/0168854 A1* | 6/2023 | Kim | ............ | G06F 1/1641 |
| | | | | 345/2.2 |
| 2023/0195400 A1* | 6/2023 | Woo | ............ | G06F 1/1652 |
| | | | | 345/667 |

* cited by examiner

COMPUTE BOX AND CORRESPONDING SYSTEMS AND METHODS FOR FORMATTING CONTENT FOR PRESENTATION ON FLEXIBLE CONTENT PRESENTATION COMPANION DEVICES

BACKGROUND

Technical Field

This disclosure relates generally to electronic devices, and more particularly to electronic devices operable with content presentation companion device having deformable displays.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. Since the displays of some deformable devices can deform as well, thereby changing the geometric configuration of the display, it would be advantageous to have an improved electronic device and corresponding methods that allow the user to interact with visible areas of the display in a seamless manner.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
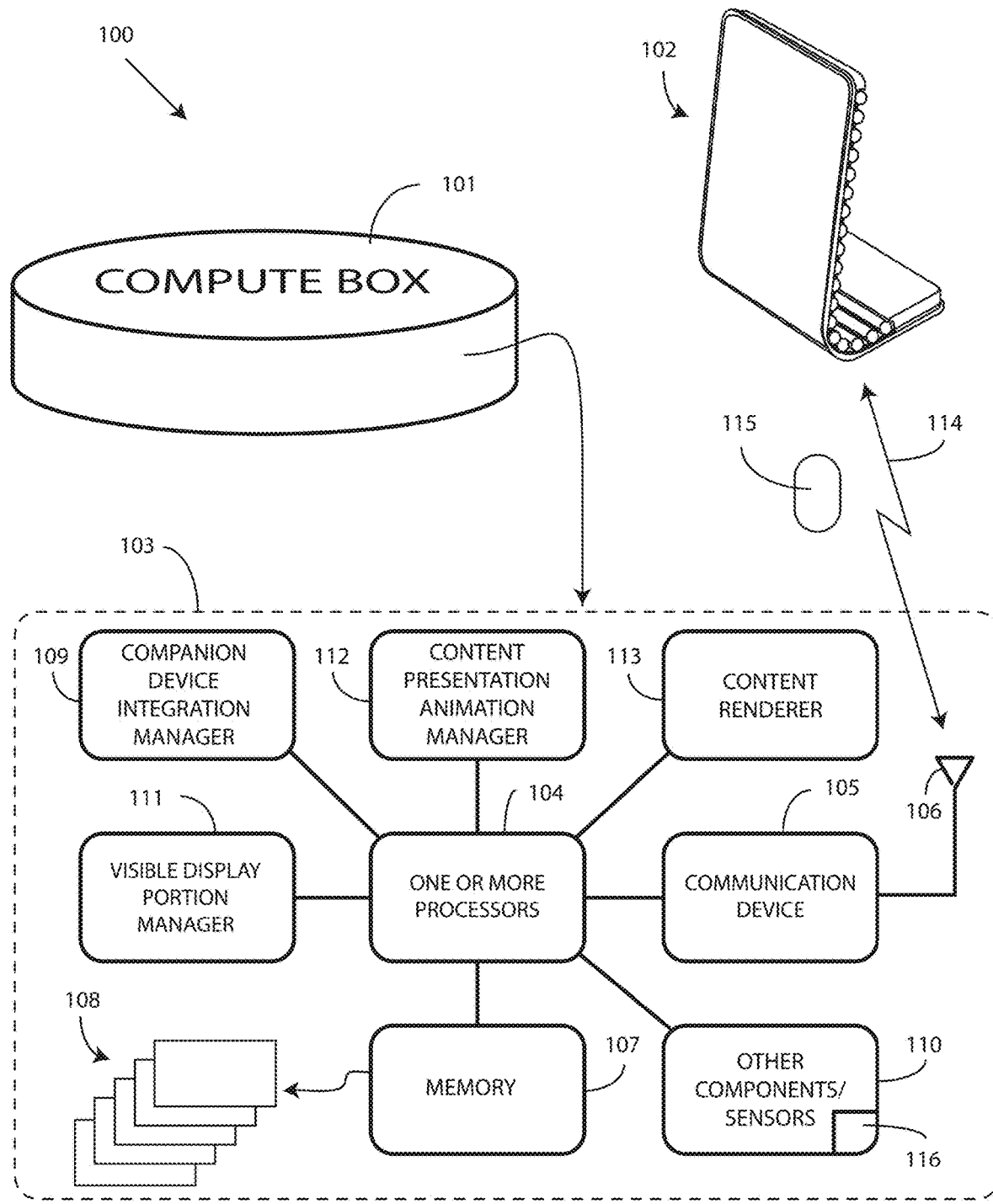
FIG. 1 illustrates one explanatory compute box in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining a visible area on a flexible display of a flexible content presentation companion device as a function of a geometric configuration of the flexible content presentation companion device, formatting content for presentation on the visible area available on the flexible content presentation companion device, and causing the content to be presented in the visible area available on the flexible content presentation companion device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of rendering content for presentation on a visible area available on the flexible content presentation companion device defined by the geometric configuration of the flexible content presentation companion device, adjusting the rendered content as the visible area available on the flexible content presentation companion device changes with the geometric configuration of the flexible content presentation companion device, and causing the presentation of the rendered content on the visible area available on the flexible content presentation companion device as described herein. The non-processor circuits may include, but are not limited to, a radio receiver, a radio transmitter, signal drivers, clock circuits, power source circuits, and user input devices. As such, these functions may be interpreted as steps of a method to perform formatting content for a visible area available on the flexible content presentation companion device of a flexible content presentation companion device as a function of the geometric configuration of the content presentation companion device and causing that content to be presented in the visible area available on the flexible content presentation companion device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a "compute box" that is operable with one or more content presentation companion devices. In one or more embodiments, each content presentation companion device is deformable, having a flexible display that deforms with the device housing of the content presentation companion device, thereby making it a flexible content presentation companion device.

Embodiments of the disclosure contemplate that it is advantageous to keep the form factor of the flexible content presentation companion device slim, dynamic, and deformable. Consequently, it is not always possible to have a large battery or large components such as powerful processors, large image capture devices, and so forth in such devices. Given these limitations, the compute box provides the computing power for the flexible content presentation companion device, while the flexible content presentation companion device presents content and includes limited user interface components. Effectively, the compute box is akin to the mainframe computer of yesteryear, while each flexible content presentation companion device defines a sort of flexible, wireless terminal that serves as a primary user interface for the compute box. The compute box can perform processing operations and render content, while the flexible content presentation companion device renders that content to a user and serves as a user interface with which to control the operations of the compute box.

Since the flexible content presentation companion device can change form factors dynamically while in operation, embodiments of the disclosure contemplate that the visible area available to a user can change while content is actively, and dynamically, being presented. Illustrating by example, if the flexible content presentation companion device is flat, the entire area of the flexible display may be visible. By contrast, if the flexible content presentation companion device is folded in half, only half of the available area of the flexible display will eb visible, and so forth.

Advantageously, embodiments of the disclosure provide devices, systems, and methods for dynamically adjusting the content presentation on a flexible content presentation companion device as a function of the geometric configuration of that flexible content presentation companion device. Thus, if a user is watching a television show when the flexible content presentation companion device is flat, thereby using all of the flexible display of the flexible content presentation companion device, and then bends the flexible content presentation companion device in a loop to wear it around a wrist, embodiments of the disclosure can dynamically and seamlessly, cause the television show to morph to adjust the visible area available on the flexible content presentation companion device after the flexible content presentation companion device is deformed. In one or more embodiments, this occurs when the compute box generates a visible display area adjustment animation for the content while the visible area of the flexible content presentation companion device is changing.

In one or more embodiments, a compute box comprises a communication device and one or more processors operable with the communication device. In one or more embodiments, the one or more processors—in response to the communication device being electronically in communication with a flexible content presentation companion device—determine a visible area available on the flexible content presentation companion device as a function of the geometric configuration of the flexible content presentation companion device from signals received from the flexible content presentation companion device. Thereafter, the one or more processors of the compute box format content for presentation on the visible area available on the flexible content presentation companion device and cause the communication device to deliver the content to the flexible content presentation companion device for presentation in the visible area available on the flexible content presentation companion device.

In one or more embodiments, in response to the communication device receiving other signals from the flexible content presentation companion device, the one or more processors detect that the geometric configuration of the flexible content presentation companion device is changing. In response, the one or more processors generate a visible display area adjustment animation for the content and cause the communication device to deliver the visible display area adjustment animation for the content for presentation in a different visible area available on the flexible content presentation companion device as a result of the geometric configuration of the flexible content presentation companion device changing.

In one or more embodiments, this visible display area adjustment animation seamlessly and dynamically—in real time—causes the content to morph from the original visible area available on the flexible content presentation companion device to the new visible area available on the flexible content presentation companion device remaining after the flexible content presentation companion device has been deformed. Illustrating by example, in one or more embodiments the visible display area adjustment animation changes a size of the content. In other embodiments, the visible display area adjustment animation changes the aspect ratio of the content. Other ways of morphing the content using a visible display area adjustment animation in response to changes in the geometric configuration of the flexible content presentation companion device will be obvious to those of ordinary skill in the art having the benefit of this disclosure.

In one or more embodiments, the one or more processors of the compute box determine that the compute box is communicatively coupled to the flexible content presentation companion device using a wireless protocol such as the ReadyFor.sup.™ communication protocol offered by Motorola Mobility, Bluetooth.sup.™, the Remote Desktop Protocol, Miracast.sup.™, or another protocol. Where the content presentation companion device is flexible such that it can be transformed into different geometric configurations, there is a need to adapt content when the geometric configuration changes.

Illustrating by example, when a flexible content presentation companion device can be deformed between a loop geometric configuration where it can be at least partially wrapped around a wrist, a stand geometric configuration where the flexible display is partially open with the remainder of the flexible display remaining flat to form a stand, a tent geometric configuration where the device housing of the flexible content presentation companion device is folded in a tent shape, and a flat geometric configuration where substantially all, or all, of the flexible display is visible, in one or more embodiments sensors in the flexible content presentation companion device cand determine that the flexible content presentation companion device is being deformed from a first geometric configuration to a different geometric configuration.

In one or more embodiments, a communication device in the flexible content presentation companion device initiates communication of the new form factor of the flexible content presentation companion device to the compute box once the geometric configuration has reached a threshold state. One or more processors of the compute box can then generate a visible display area adjustment animation and deliver the visible display area adjustment animation to the flexible content presentation companion device as the transformation of geometric configuration progresses. The flexible content presentation companion device can then render the visible display area adjustment animation on the flexible display of the electronic device to provide a seamless and dynamic real time transformation from a first content presentation to another content presentation.

In one or more embodiments, a compute box and a flexible content presentation companion device establish peer-to-peer electronic communication. Internal sensors in the flexible content presentation companion device detect the geometric configuration of the flexible content presentation companion device changing. The flexible content presentation companion device then signals indicating as much to the compute box, which generates the visible display area adjustment animation in response to the signals. The visible display area adjustment animation is then communicated back to the flexible content presentation companion device, thereby providing the best adaptive display presentation capabilities at the flexible content presentation companion device without burdening the lesser processors of the flexible content presentation companion device. Embodiments of the disclosure are well suited for implementation into content presentation companion devices where it is difficult to include large batteries or high-power processors due to form factor limitations. The compute box does the work, the flexible content presentation companion device simply renders the visible display area adjustment animation to transition content from a first visible area available on the flexible content presentation companion device to a second, different visible area available on the flexible content presentation companion device.

In one or more embodiments, a compute box comprises one or more processors and a communication device. A flexible content presentation companion device comprises a flexible display and is electronically in communication with the compute box.

In one or more embodiments, the flexible content presentation companion device receives content for presentation on a visible area of the flexible display defined by a geometric configuration of the flexible content presentation companion device. When the geometric configuration of the flexible content presentation companion device changes to reduce or enlarge the visible area of the flexible display, the one or more processors of the compute box adjust a rendering of the content to reduce or enlarge the content in accordance with the reduction or enlargement of the visible area of the flexible display. In one or more embodiments, this comprises generating a visible display area adjustment animation to adjust the rendering while the visible area of the flexible display is changing.

Turning now to FIG. 1, illustrated therein is one explanatory system 100 in accordance with one or more embodiments of the disclosure. In one or more embodiments, the system 100 includes a compute box 101 and a flexible content presentation companion device 102 that is in communication with the compute box 101. While one compute box 101 is shown in FIG. 1, in other embodiments a single compute box 101 can be in communication with multiple flexible content presentation companion devices.

In one or more embodiments, to allow the flexible content presentation companion device 102 to be deformable (it is shown in a stand geometric configuration in FIG. 1), there is little room for internal components, sensors, and other user interface devices that might be found, say, in a smartphone or tablet computer. Accordingly, most all computing processes for the flexible content presentation companion device 102 are performed by the compute box 101. This allows the flexible content presentation companion device 102 to remain light, bendable, and highly configurable without a loss of apparent processing power. The compute box 101 provides the processing power for the system 100, while the flexible content presentation companion device 102 serves as a content presentation device and user interface for the compute box 101.

In combination, the compute box 101 and the flexible content presentation companion device 102 can perform the functions of a conventional electronic device, such as a smartphone. However, the system 100 can work to perform the equivalent functions of any number of other devices as well, including tablet computers, gaming devices, multimedia players, and so forth. Still other types of electronic devices for which the system 100 can perform functions in accordance with one or more embodiments of the disclosure as will be readily appreciated by those of ordinary skill in the art having the benefit of this disclosure.

The compute box 101 of this illustrative embodiment is configured as a "puck" or "puc" that can be conveniently carried in a pocket, purse, backpack, or satchel. The compute box 101 includes a device housing but has no primary display. Instead, the flexible content presentation companion device 102 functions as the primary display for the compute box 101. The flexible content presentation companion device 102 also functions as the primary user interface for the compute box 101.

In one or more embodiments, the device housing is manufactured from a rigid material such as a rigid thermoplastic, metal, or composite material, although other materials can be used. In one illustrative embodiment, the device housing is manufactured from a thermally conductive material. Illustrating by example, in one illustrative embodiment the device housing is manufactured from aluminum. Since the user holds the flexible content presentation companion device 102 and generally need not hold the compute box 101, the use of a thermally conductive material advantageously allows for thermal energy generated by heat generating electronics situated within the compute box 101 to be distributed along the surfaces of the device housing for emission into the environment for radiative cooling. Still other constructs will be obvious to those of ordinary skill in the art having the benefit of this disclosure.

Features can be incorporated into the device housing. Examples of such features include a power switch, ports for charging or connecting content presentation companion devices by wire, and so forth. User interface components such as a button, biometric sensor, or touch sensitive surface, can also be supported by the device housing to unlock the compute box 101. In other embodiments, these features may be omitted.

A block diagram schematic 103 of the compute box 101 is also shown in FIG. 1. The block diagram schematic 103 includes one or more electronics components that can be coupled to a printed circuit board assembly disposed within the device housing of the compute box 101. The electronic components can be coupled together by conductors or a bus disposed along one or more printed circuit boards.

In one or more embodiments, the compute box 101 includes one or more processors 104. In one embodiment, the one or more processors 104 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the compute box 101. Each of the application processor and the auxiliary processor(s) can be configured to process and execute executable software code to perform the various functions of the compute box 101. A storage device, such as memory 107, can optionally store the executable software code used by the one or more processors 104 during operation.

In this illustrative embodiment, the compute box 101 also includes a communication device 105 that can be configured for wired or wireless communication with one or more other devices or networks. The networks can include a wide area network, a local area network, and/or personal area network. The communication device 105 may also utilize wireless technology for communication, such as, but are not limited to, peer-to-peer or ad hoc communications such as HomeRF, Bluetooth and IEEE 802.11, and other forms of wireless communication such as infrared technology. The communication device 105 can include wireless communication circuitry, one of a receiver, a transmitter, or transceiver, and one or more antennas 106. In FIG. 1, the communication device 105 is shown as being electronically in communication with the flexible content presentation companion device 102 via signals transceived by the one or more antennas 106.

In one embodiment, the one or more processors 104 can be responsible for performing the primary functions of the compute box 101. For example, in one embodiment the one or more processors 104 comprise one or more circuits operable with one or more user interface devices of the flexible content presentation companion device 102, which can include the display of the flexible content presentation companion device 102, to present, images, video, or other presentation information to a user. The executable software code used by the one or more processors 104 can be configured as one or more modules 108 that are operable with the one or more processors 104. Such modules 108 can store instructions, control algorithms, logic steps, and so forth.

In one embodiment, the one or more processors 104 are responsible for running the operating system environment of the compute box 101. The operating system environment can include a kernel and one or more drivers, and an application service layer, and an application layer. The operating system environment can be configured as executable code operating on one or more processors or control circuits of the compute box 101. The application layer can be responsible for executing application service modules.

The application service modules may support one or more applications or "apps." The applications of the application layer can be configured as clients of the application service layer to communicate with services through application program interfaces (APIs), messages, events, or other interprocess communication interfaces. Where auxiliary processors are used, they can be used to execute input/output functions, actuate user feedback devices, and so forth.

In one embodiment, the one or more processors 104 may generate commands or execute control operations based on information received from the various components and sensors 110. The one or more processors 104 may also generate commands or execute control operations based upon information received the flexible content presentation companion device 102. Moreover, the one or more processors 104 may process the received information alone or in combination with other data, such as the information stored in the memory 107.

The other components and sensors 110 may include a microphone, a loudspeaker, and a user interface component such as a button or touch-sensitive surface. The other components and sensors 110 can also include motion detectors, such as one or more accelerometers or gyroscopes. Still other components will be obvious to those of ordinary skill in the art having the benefit of this disclosure.

In one or more embodiments, the compute box 101 includes a companion device display integration manager 109. When another device such as the flexible content presentation companion device 102 transmits user interface controls, signals, or other information to the compute box 101, the companion device display integration manager 109 delivers that information to the one or more processors 104 for processing. Illustrating by example, when user interface control signals are redirected from the flexible content presentation companion device 102 to the compute box 101, the one or more processors 104 can perform processing operations to generate content for presentation on the flexible content presentation companion device 102. This will be illustrated in more detail below with reference to FIGS. 13-15.

In one or more embodiments, the one or more processors 104 can define one or more process engines. For instance, the software code stored within the memory 107 can embody program instructions and methods to operate the various functions of the compute box 101 and also to execute software or firmware applications and.

Examples of process engines shown in FIG. 1 include a visible display portion manager 111, a content presentation animation manager 112, and a content renderer 113. Such process engines can be a component of the one or more processors 104, operable with the one or more processors 104, defined by the one or more processors 104, and/or integrated into the one or more processors 104. Other configurations for these engines, including as software or firmware modules operable on the one or more processors 104, will be obvious to those of ordinary skill in the art having the benefit of this disclosure.

Where included, the process engines can be configured to determine present, alter, adapt, and manage content on the display of the flexible content presentation companion device 102. Illustrating by example, the content renderer 113 is configured to render content for presentation on a visible portion of the flexible display of the flexible content presentation companion device 102 defined by the geometric configuration of the flexible content presentation companion device 102. In the illustrative embodiment of FIG. 1, the flexible content presentation companion device 102 has been deformed into a "stand" configuration, which leaves only about two thirds of the display of the flexible content presentation companion device 102 visible to a user. The remainder of the display is situated between the surface upon which the flexible content presentation companion device 102 rests, and therefore cannot be seen by a user. In one or more embodiments, the content renderer 113 would format content for presentation only on the visible portion of this display, since the "stand" portion of the display cannot be seen.

The visible display portion manager 111 receives signals from the flexible content presentation companion device 102, and in particular from one or more sensors situated in the flexible content presentation companion device 102, that indicate what the current geometric configuration and orientation in three-dimensional space of the flexible content presentation companion device 102 may be. From this information, the visible display portion manager 111 informs the content renderer 113 regarding how much of the display of the flexible content presentation companion device 102 is likely visible. Thus, the visible display portion manager 111 infers what the visible portion of the flexible content presentation companion device 102 is so that the content renderer 113 can render the content appropriately.

The content presentation animation manager 112 generates visible display area adjustment animation for content when the geometric configuration of the flexible content presentation companion device 102 changes. In one or more embodiments, the content presentation animation manager 112 continues to generate the visible display area adjustment animation so long as the geometric configuration of the flexible content presentation companion device 102 is changing. The visible display area adjustment animation causes the content to smoothly and dynamically change a first content rendering for a first visible area available on the flexible content presentation companion device 102 to a second content rendering for a second visible area available on the flexible content presentation companion device 102.

In one or more embodiments, each of these processing engines is capable of determining assessed contexts and frameworks using adjustable algorithms of context assessment employing information, data, and events. These assessments may be learned through repetitive data analysis. Alternatively, a user may employ use the flexible content presentation companion device 102 as a user interface for the compute box 101 to enter various parameters, constructs, rules, and/or paradigms that instruct or otherwise guide the process engines in detecting contextual information. The process engines can comprise an artificial neural network or other similar technology in one or more embodiments.

The inclusion of the processing engines allows the flexible content presentation companion device 102 to be operable with the compute box 101 in a "ready for" environment. Illustrating by example, in this embodiment the compute box 101 includes a companion device display integration manager 109. The companion device display integration manager 109 can be used to communicate with the flexible content presentation companion device 102. When coupled by a wireless connection to the flexible content presentation companion device 102 through the communication device 105 and one or more antennas 106, the flexible content presentation companion device 102 functions as the primary (and in this case, only) display for the system 100. While the compute box 101 processes content, that content is then redirected to the flexible content presentation companion device 102 for presentation to a user. In one or more embodiments, content flows from the compute box 101 to the flexible content presentation companion device 102 through the communication device 105.

It is to be understood that FIG. 1 is provided for illustrative purposes only and for illustrating components of one compute box 101 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
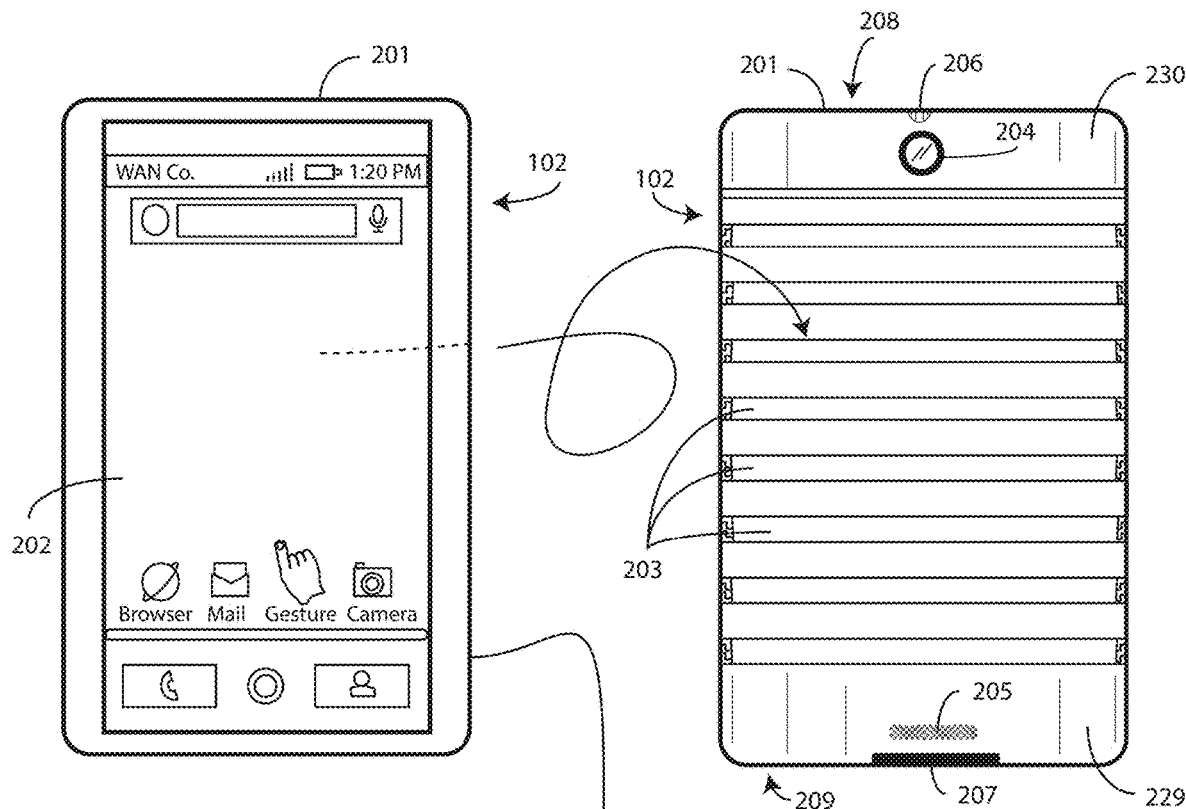
FIG. 2 illustrates one explanatory deformable content presentation companion device in accordance with one or more embodiments of the disclosure.
Figure 2:
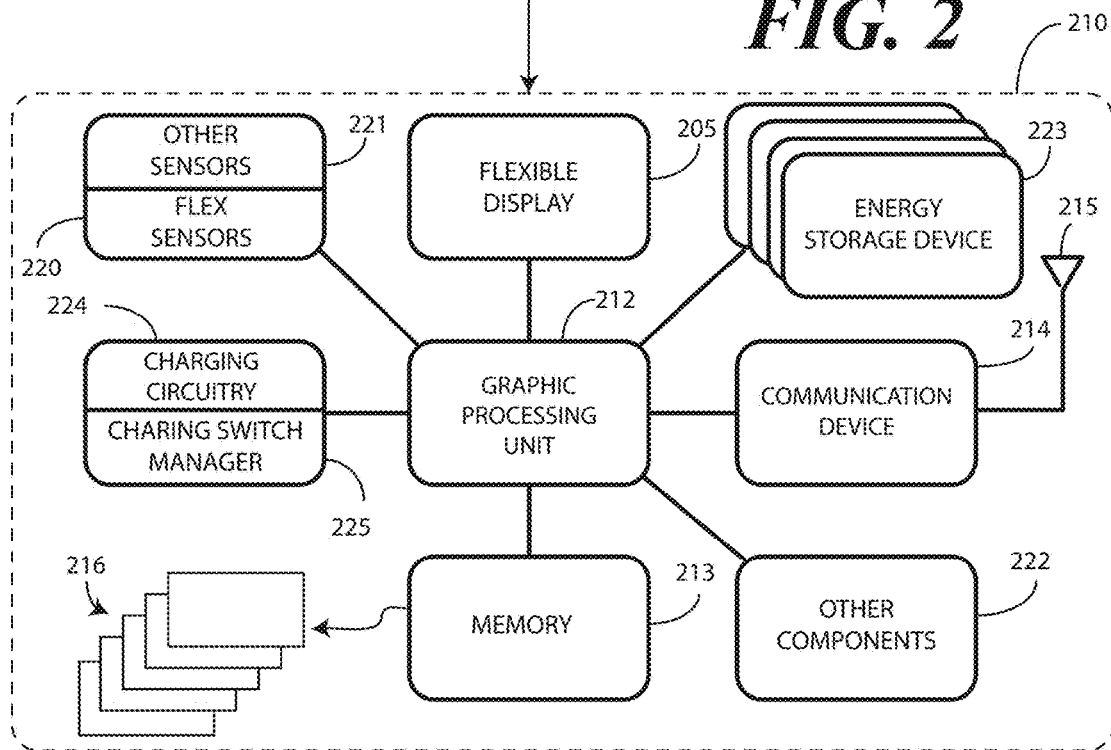

Turning now to FIG. 2, illustrated therein is additional detail regarding the flexible content presentation companion device 102 of FIG. 1. The flexible content presentation companion device 102 of FIGS. 1-2 is a portable electronic device. In one or more embodiments, the flexible content presentation companion device 102 includes a deformable housing 201 that includes one or more linkage members 203 that allows the flexible content presentation companion device 102 to be deformed by bending or folding. Advantageously, this allows the flexible content presentation companion device 102 to function as the equivalent to multiple devices depending upon the amount of deformation of the deformable housing 201.

For example, the flexible content presentation companion device 102 is shown in an unbent configuration in FIG. 2, and accordingly can function, in tandem with the compute box (101), as the equivalent of a smartphone, palm-top computer, or tablet computer. However, as will be shown below with reference to FIGS. 3-5, in other embodiments the flexible content presentation companion device 102 can be folded and can accordingly function as a table clock, content viewer, wrist loop, or auxiliary display when in a bent condition. It should be obvious to those of ordinary skill in the art having the benefit of this disclosure that the flexible content presentation companion device 102 can function with the compute box (101) as other devices as a function of its physical geometry, including as a gaming device, a media player, or other device.

This illustrative flexible content presentation companion device 102 includes a display 202, which may optionally be touch-sensitive. In one embodiment where the display 202 is touch-sensitive, the display 202 can serve as a primary user interface of the flexible content presentation companion device 102. Users can deliver user input to the display 202 of such an embodiment by delivering touch input from a finger, stylus, or other objects disposed proximately with the display.

In one embodiment, the display 202 is configured as an organic light emitting diode (OLED) display fabricated on a flexible plastic substrate. However, it should be noted that other types of displays would be obvious to those of ordinary skill in the art having the benefit of this disclosure. In one or more embodiments, an OLED is constructed on flexible plastic substrates can allow the display 202 to become flexible in one or more embodiments with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the display 202 may be formed from multiple layers of flexible material such as flexible sheets of polymer or other materials.

The explanatory flexible content presentation companion device 102 of FIG. 2 also includes a deformable housing 201 that includes one or more linkage members 203. The linkage members 203 allow portions of the deformable housing 201 to pivot about each linkage member 203 so that the flexible content presentation companion device 102 becomes bendable and/or foldable. While the deformable housing 201 can be manufactured from segments of a rigid material that each bend around a corresponding hinge mechanism, such as a rigid thermoplastic or composite material, other materials can be used. Illustrating by example, the deformable housing 201 can be manufactured from a bendable material that both supports the display 202 and allows for deformation of the deformable housing 201 around the linkage members 203 as well.

In this illustrative embodiment, the display 202 is coupled to the deformable housing 201. In one embodiment, the lower surface of the display 202, or another layer in the mechanical stack-up of the display 202, can be adhered to the deformable housing 201, or alternatively to portions of the deformable housing 201. In either embodiment, the display 202 also spans the linkage members 203. In one or more embodiments, the display 202 is flexible so as to deform when the deformable housing 201 bends around the linkage members 203.

Features can be incorporated into the deformable housing 201. Examples of such features include an optional image capture device 204 or an optional speaker port 205, which are shown disposed on the rear side of the flexible content presentation companion device 102 in this embodiment but could be placed on the front side as well. A user interface component, which may be a button or touch sensitive surface, can also be disposed along the rear side of the deformable housing 201.

In one embodiment, the flexible content presentation companion device 102 includes one or more connectors 206,207, which can include an analog connector, a digital connector, or combinations thereof. In this illustrative embodiment, connector 206 is an analog connector disposed on a first end 208, i.e., the top end, of the flexible content presentation companion device 102, while connector 207 is a digital connector disposed on a second end 209 opposite the first end 208, which is the bottom end in this embodiment.

A block diagram schematic 210 of the flexible content presentation companion device 102 is also shown in FIG. 2. The block diagram schematic 210 can be configured as a printed circuit board assembly disposed within the deformable housing 201. Various components can be electrically coupled together by conductors or a bus disposed along one or more printed circuit boards. A flexible substrate can then span the linkage members 203 to electrically couple electronic circuits together.

In one or more embodiments, the flexible content presentation companion device 102 includes a graphic processing unit 212. The graphic processing unit 212, which can be comprises of one or more processors, receives content from a compute box (101) and renders that content on the display 202. While the graphic processing unit 212 can include one or more processors, to keep the overall size and form factor of the flexible content presentation companion device 102 light and clean, in one or more embodiments the processing power of the graphic processing unit 212 is significantly less than is the processing power of the one or more processors (104) of the compute box (101). Still, in one or more embodiments the graphic processing unit 212 can perform limited functions of the flexible content presentation companion device 102 and can be operable with the various components of the flexible content presentation companion device 102. The graphic processing unit 212 can process and execute executable software code to perform the various functions of the flexible content presentation companion device 102 such as presenting content on the display 202. A storage device, such as memory 213, can optionally store the executable software code used by the graphic processing unit 212 during operation.

In this illustrative embodiment, the flexible content presentation companion device 102 also includes a communication device 214 that can be configured for wired or wireless communication with one or more other devices or networks. Illustrating by example, the communication device 214 can establish electronic communication with a compute box (101) as described above. The networks can include a wide area network, a local area network, and/or personal area network. The communication device 214 may also utilize wireless technology for communication, such as, but are not limited to, peer-to-peer or ad hoc communications such as HomeRF, Bluetooth and IEEE 802.11, and other forms of wireless communication such as infrared technology. The communication device 214 can include wireless communication circuitry, one of a receiver, a transmitter, or transceiver, and one or more antennas 215.

In one embodiment, the graphic processing unit 212 can be responsible for performing the primary functions of the flexible content presentation companion device 102. For example, in one embodiment the graphic processing unit 212 comprise one or more circuits operable with one or more user interface devices, which can include the display 202, to present, images, video, or other presentation information received from a compute box (101) to a user. The executable software code used by the graphic processing unit 212 can be configured as one or more modules 216 that are operable with the graphic processing unit 212. Such modules 216 can store instructions, control algorithms, logic steps, and so forth.

Figure 3:
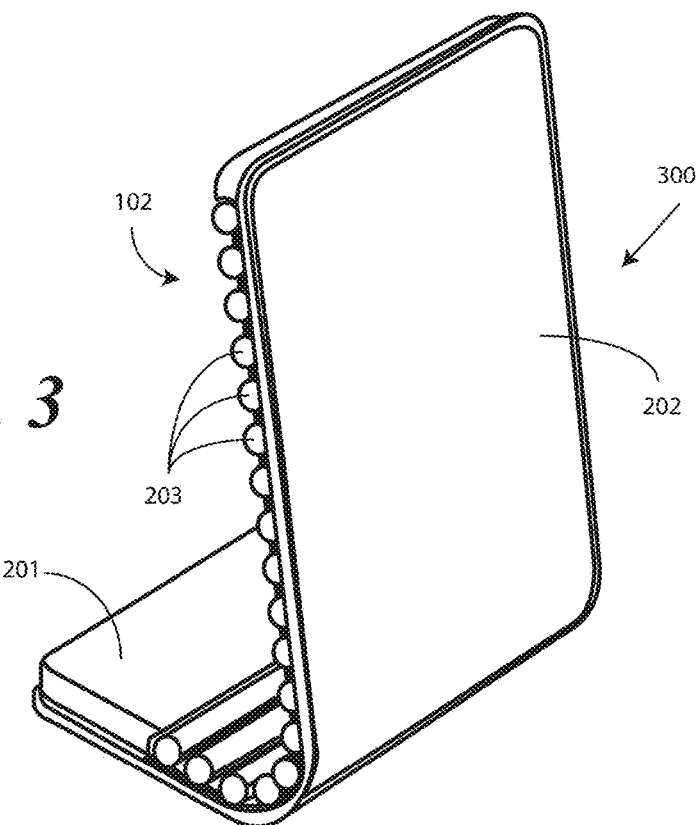
FIG. 3 illustrates one explanatory deformable content presentation companion device in accordance with one or more embodiments of the disclosure when in a deformed "stand" configuration.
Figure 4:
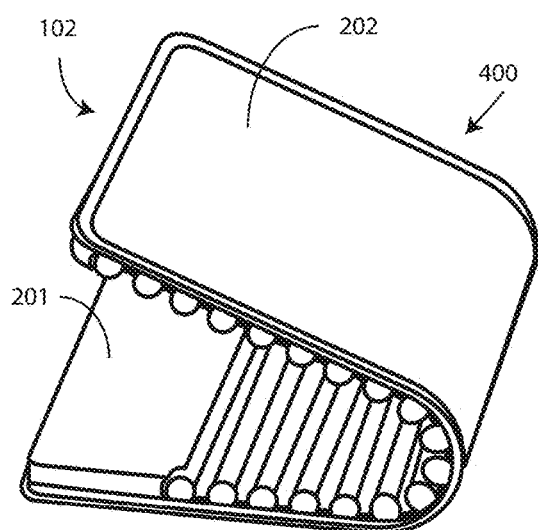
FIG. 4 illustrates the explanatory deformable content presentation companion device of FIG. 3 when in a deformed "tent" configuration.
Figure 5:
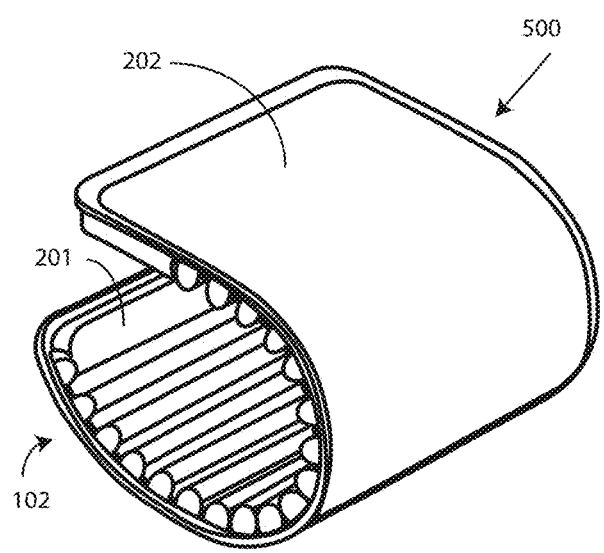
FIG. 5 illustrates the explanatory deformable content presentation companion device of FIG. 3 when deformed in a "wrapped" configuration.

In one embodiment, the flexible content presentation companion device 102 includes one or more flex sensors 220 that are operable to detect a bending operation that causes the deformable housing 201 to deform, thereby transforming the flexible content presentation companion device 102 into a deformed geometry, such as that shown in FIGS. 3-5. The inclusion of flex sensors 220 is optional, and in some embodiment flex sensors 220 will not be included. Where flex sensors 220 are not included and device operation is a function of the amount of deformation of the deformable housing 201, the user can deliver input to the display 202 of the flexible content presentation companion device 102 to inform the compute box (101) to the fact that the one or more bends are present through the user interface or by other techniques.

In one embodiment, the flex sensors 220 comprise passive resistive devices manufactured from a material with an impedance that changes when the material is bent, deformed, or flexed. By detecting changes in the impedance as a function of resistance, the one or more flex sensors 220 detect bending of the deformable housing 201. In one or more embodiments, each flex sensor 220 comprises a bi-directional flex sensor that can detect flexing or bending in two directions. In one embodiment, the one or more flex sensors 220 have an impedance that increases in an amount that is proportional with the amount it is deformed or bent.

In one embodiment, each flex sensor 220 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 220 bends, the impedance of the resistive layer changes, thereby altering the flow of current for a given voltage. Taps can be added along each flex sensor 220 to determine other information, including the amount of bending, the direction of bending, and so forth. The flex sensor 220 can further be driven by time-varying signals to increase the amount of information obtained from the flex sensor 220 as well. While a multi-layered device as a flex sensor 220 is one configuration suitable for detecting at least a bending operation occurring to deform the flexible content presentation companion device 102 and a geometry of the flexible content presentation companion device 102 after the bending operation, others can be used as well. Other types of flex sensors 220 will be obvious to those of ordinary skill in the art having the benefit of this disclosure.

The one or more other sensors 221 may include a microphone, an earpiece speaker, a second loudspeaker (disposed beneath speaker port 205), and a user interface component such as a button or touch-sensitive surface. The one or more other sensors 221 may include one or more of an accelerometer, gyroscope, image capture device, and/or display touch sensors to determine whether the flexible content presentation companion device 102 is being held on the base side or flip side in a portrait mode.

The one or more other sensors 221 may also include key selection sensors, proximity sensors, a touch pad sensor, a touch screen sensor, a capacitive touch sensor, and one or more switches. Touch sensors may be used to indicate whether any of the user actuation targets present on the display 202 are being actuated. Alternatively, touch sensors disposed in the flexible content presentation companion device 102 can be used to determine whether the flexible content presentation companion device 102 is being touched at side edges or major faces of the deformable housing 201. The touch sensors can include surface and/or housing capacitive sensors in one embodiment. The other sensors 221 can also include audio sensors and video sensors (such as a camera).

The other sensors 221 can also include motion detectors, such as one or more accelerometers or gyroscopes. For example, an accelerometer may be embedded in the electronic circuitry of the flexible content presentation companion device 102 to show vertical orientation, constant tilt and/or whether the flexible content presentation companion device 102 is stationary. A gyroscope can be used in a similar fashion.

Other components 222 of the flexible content presentation companion device 102 can include output components such as video outputs, audio outputs, and/or mechanical outputs. Examples of output components include audio outputs such as speaker port 205, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the flexible content presentation companion device 102 comprises a plurality of energy storage devices 223. In one or more embodiments, the plurality of energy storage devices 223 include an energy storage device situated in each linkage member 203. In one or more embodiments, each energy storage device of the plurality of energy storage devices 223 situates in a corresponding linkage member 203 on a one-to-one basis. Each energy storage device of the plurality of energy storage devices 223 can take a variety of forms.

In the illustrative embodiment of FIG. 2, the plurality of energy storage devices 223 are situated on a rear side of the deformable housing 201. In this example, the plurality of energy storage devices 223 are situated between an electronics component enclosure 229 and an end cap 230. In one or more embodiments, each energy storage device of the plurality of energy storage devices 223 spans a width of the deformable electronic device as shown in FIG. 2.

In an illustrative embodiment, each energy storage device of the plurality of energy storage devices 223 can comprise an electrochemical cell. For instance, the plurality of energy storage devices 223 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 223 may be a supercapacitor, and so forth.

In one or more embodiments, a first energy storage device is situated in a first hinge mechanism, with a second energy storage device situated in a second hinge mechanism, and so forth. In one or more embodiments, an electrical conductor couples the energy storage devices of the plurality of energy storage devices 223 together and/or to the components of the block diagram schematic 210.

Charging circuitry 224 can be included to selectively individual, subsets, or all of the plurality of energy storage devices 223 when depleted. In one or more embodiments, the charging circuitry 224 comprises a charging node that is coupled to each energy storage device of the plurality of energy storage devices 223.

In one or more embodiments, the charging circuitry 224 includes a switch 225 that is electrically coupled between the conductor coupling the plurality of energy storage devices 223. Opening the switch 225 disconnects the conductor from the plurality of energy storage devices 223, while closing the switch couples the plurality of energy storage devices 223 to the components of the block diagram schematic 210.

It is to be understood that FIG. 2 is provided for illustrative purposes only and for illustrating components of one flexible content presentation companion device 102 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the flexible content presentation companion device 102. For example, a user can apply force at the first end 208 and the second end 209 of the flexible content presentation companion device 102 to pivot portions of the deformable housing 201 relative to other portions of the deformable housing 201. This method of deforming the deformable housing 201 allows the user to simply and quickly bend the flexible content presentation companion device 102 into a desired shape.

In other embodiments, rather than relying upon the manual application of force, the flexible content presentation companion device 102 can include a mechanical actuator to deform the deformable housing 201 around the linkage members 203. For example, a motor or other mechanical actuator can be operable with structural components to deform the deformable housing 201 around the linkage members 203 to predetermined angles or geometric alignments in one or more embodiments. The inclusion of a mechanical actuator allows a precise bend angle to be repeatedly achieved without the user having to make adjustments. However, as the inclusion of a mechanical actuator can increase cost, in other embodiments this component will be omitted.

It should be noted that in one or more embodiments, the display 202 has a compliance coefficient that can be used advantageously to help counter the bending operation. Illustrating by example, when the bending operation transforms the flexible content presentation companion device 102 to a bent configuration, examples of which is shown below with reference to FIGS. 3-5, in one or more embodiments the mechanical layers of the display 202 are loaded by the bending operation and work to bias portions of the deformable housing 201 back to the open position of FIG. 2.

Moreover, in one or more embodiments a thin stainless-steel plate (approximately 0.04 millimeters in thickness) forms one layer of the display 202 and will increase the loading. This mechanical loading of the layers of the display 202 can be used to help the user transform the flexible content presentation companion device 102 from folded or partially folded configurations to unfolded configurations in one or more embodiments. The modulus of the display 202 can range from 40-300 giga-Pascals in one or more embodiments.

Regardless of whether the bending operation is a manual one or is instead one performed by a mechanical actuator, it results in the display 202 being deformed by one or more bends about the linkage members. Turning briefly to FIGS. 2-5, illustrated therein are some explanatory results of various bending operations.

Beginning with FIG. 3, in this illustrative embodiment the flexible content presentation companion device 102 has been placed on a table or other flat surface, with the bending operation leaving the flexible content presentation companion device 102 into a stand configuration 300 having a single bend. This bent configuration can make the display 202 easier for the user to view since they do not have to hold the flexible content presentation companion device 102 in their hands.

As shown in FIG. 3, the display 202 is deformed about the linkage members 203 as portions of the deformable 2 are bent into a "stand" configuration 200. In this illustrative embodiment, the display 202 has a single bend about the linkage members 203. However, in other embodiments, the display 202 can be deformed with a plurality of bends about the linkage members.

Other configurations will be obvious to those of ordinary skill in the art having the benefit of this disclosure. Illustrating by example, turning to FIG. 4, the flexible content presentation companion device 102 has been bent further to resemble a playing card bent into a "tent" configuration 400. In one or more embodiments, the tent configuration 400, when the flexible content presentation companion device 102 is placed on a surface, makes the display 202 easier to see from above. Turning to FIG. 5, in this example the flexible content presentation companion device 102 is deformed into a "wrapped" configuration 500. When in the wrapped configuration 500, the flexible content presentation companion device 102 can even be worn on a wrist.

In one or more embodiments, the linkage members 203 define a multi-link hinging mechanism for the flexible content presentation companion device 102. While eighteen linkage members 203 are shown in this embodiment, the flexible content presentation companion device 102 can include more, or fewer linkage members 203.

In one embodiment, each of the linkage members 203 is stepped with the rigid purlins to receive and protect the display 202, which is flexible. In one or more embodiments, a locking bar can be integrated with the linkage members 203 to further improve rigidity and constrain motion.

As used herein, a "purlin" is defined as a beam along a width of the flexible display, which rests between two links and supports a major face the flexible display. This is similar to the architectural purlin, which is a horizontal beam along the length of a roof, resting on a main rafter and supporting the common rafters or boards. The purlins disposed between the display 202 and the linkage members 203 provide mechanical support along the major surface of the display 202.

In this illustrative embodiment, linkage members 203 are all similarly configured with links separating each linkage member 203. Each linkage member 203 comprises a pivot. The pivot can be configured with mechanical features that provide drive functions, resistance functions, stage stop functions, and other functions that alter the way that the flexible content presentation companion device 102 deforms. For example, the pivot can house cam and follower assemblies, geared assemblies, spring assemblies, and other assemblies that assist the flexible content presentation companion device 102 in deforming, oppose the way that the flexible content presentation companion device 102 deforms, or otherwise increase or decrease the amount of force required to cause the flexible content presentation companion device 102 to deform.

In one or more embodiments, each pivot comprises an energy storage device situated therein. In one or more embodiments, each energy storage device comprises a rechargeable electrochemical cell. In some embodiments, the rechargeable electrochemical cells are surrounded by a sheath, with the sheath rotating when the linkage members 203 rotate about the pivots.

In one or more embodiments, the rechargeable electrochemical cells include a positive electrode (cathode), a negative electrode (anode), and a separator that prevents these two electrodes from touching. While a separator electrically separates the cathode and anode, the separator permits ions to pass through.

In one or more embodiments, a separator having a top and bottom is placed atop an electrode. Disposed on the top of the separator is a first layer of an electrochemically active material. For example, the first layer may be lithium or a lithium intercalation material if the rechargeable electrochemical cells are lithium ion or lithium polymer cells.

Disposed atop first layer is a current collecting layer. The current collecting layer may be fabricated of any of a number of metals or alloys known in the art. Examples of such metals or alloys include, for example, nickel, aluminum, copper, steel, nickel plated steel, magnesium doped aluminum, and so forth. Disposed atop the current collection layer is a second layer of electrochemically active material.

The rechargeable electrochemical cells store and deliver energy by transferring ions between electrodes through a separator. For example, during discharge, an electrochemical reaction occurs between electrodes. This electrochemical reaction results in ion transfer through the separator, which causes electrons to collect at the negative terminal of the cell. When connected to a load, such as the electronic components of the block diagram schematic (210) of FIG. 2, the electrons flow from the negative pole through the circuitry in the load to the positive terminal of the cell. This is shown in conventional circuit diagrams as current flowing from the cathode to the anode.

When the rechargeable electrochemical cells are charged, the opposite process occurs. Thus, to power electronic devices such as the flexible content presentation companion device 102, these electrons must be delivered from the cell to electrical components. This is generally accomplished by coupling conductors, such as conductive foil strips, sometimes referred to colloquially as "electrical tabs" to the various layers.

This electrode construct can then be stacked. Once stacked, the electrode stack can be rolled into a "jellyroll" configuration so that the same can be placed in a cylindrical can that defines the exterior surface of the rechargeable electrochemical cell. Illustrating by example, two electrodes constructed as described above can be stacked, with one electrode fabricated with a layer of active electrode material, such as an electrochemically active negative electrode material, while the other electrode is fabricated with a layer of electrochemically active positive electrode material.

A first tab can be coupled to one electrode, while a second tab is coupled to the other electrode. These tabs can be coupled to the current collectors of each electrode.

In one or more embodiments, the electrodes are arranged in stacked relationship, with the tabs being disposed on opposite edges of the stack. Thereafter, the stack is rolled into a roll, sometimes referred to as a "jellyroll," for a subsequent insertion into an electrochemical cell housing such as a cylindrical can. The cylindrical cans can each be a metal can or a plastic can. They can also be a flexible pouch, such as would be the case where the electrode assembly was a prismatic electrode assembly. Where metal or plastic, the housing can be configured to be cylindrical such that the rechargeable electrochemical cells can situated within each linkage member 203. However, in other constructs the rechargeable electrochemical cell can be rectangular or ovular in cross section. Where non-cylindrical such rechargeable electrochemical cells can be configured to serve as the pivot.

When the electrodes are rolled, one tab will end up substantially in the center of the roll, while the other tab will end up generally on the periphery of the roll. When the roll is placed in the cylindrical can housing, this results in one tab being be centrally disposed within the cylindrical can, while the other tab is disposed peripherally within the cylindrical can.

These tabs can be routed different ways within the cylindrical cans. In one or more embodiments one tab is routed to the right end of the cylindrical can, which serves as one external electrode for the rechargeable electrochemical cell. Meanwhile, the other tab is routed to the left end of the cylindrical can, which serves as the other external electrode for the rechargeable electrochemical cell. This construct works well when the rechargeable electrochemical cell is used as the pivot for the linkage members in that one electrical contact can be biased against the first external electrode on the right end of the rechargeable electrochemical cell, while another electrical contact is biased against the second electrode on the left end of the rechargeable electrochemical cell. The rechargeable electrochemical cell can then rotate as the linkage members 203 are actuated with each electrical contact remaining stationary and biased against a single location of first external electrode on the right end of the rechargeable electrochemical cell and the second electrode on the left end of the rechargeable electrochemical cell, respectively.

In other embodiments, however, both tabs can be routed to one end of the rechargeable electrochemical cell. A first external electrode and a second external electrode can be positioned on the same end of the rechargeable electrochemical cell. The first external electrode and the second external electrode can then be concentrically aligned. This allows the rechargeable electrochemical cell to be used as the pivot in the assembly. One electrical contact can be biased against the first external electrode while another electrical contact is biased against the second electrode. The rechargeable electrochemical cell can then rotate as the linkage members 203 are actuated with each electrical contact remaining stationary and biased against a single location of first external electrode and the second external electrode, respectively.

In other embodiments, such as where both tabs routed to a single end of the rechargeable electrochemical cell with the first external electrode and the second external electrode arranged in a line, a sheath or other component can be positioned about the exterior of the rechargeable electrochemical cell. That component can then rotate when the linkage members 203 actuate with the rechargeable electrochemical cell remaining stationary.

For the rechargeable electrochemical cells, the cylindrical cans can be sealed in a variety of ways. In one illustrative embodiment, the cylindrical cans can be sealed by a lid defining each end of the cylindrical can. The lids, which can be manufactured from metal, are connected to the internal tabs and serve as one electrical terminal of the rechargeable electrochemical cells. An insulator can be provided to isolate the lid from the other tab. The second tab can be the coupled to another location, be it the left end, the outer, concentrically aligned external electrode, or the second external electrode. In other embodiments, such as when the cylindrical cans are manufactured from aluminum, the cylindrical can itself can be connected to the cathode. Conversely, where the cylindrical can is manufactured from steel, it will be connected to the anode.

In alternate embodiments, the tabs can be connected to a terminal block rather than to the lid and housing. The end of each energy storage device could comprise a terminal block, for example. The terminal block, where employed, provides a convenient way for both the positive terminal and negative terminal to reside on a common end of the energy storage device. In one or more embodiments coatings, wraps, overlays, or other components can be applied the cylindrical cans when the rechargeable electrochemical cells are used as the pivots of the linkage members.

In one or more embodiments, the linkage members 203 provide one or more different mechanical functions for the flexible content presentation companion device 102. Illustrating by example, the linkage members 203 can provide mechanical support for the display 202 when the flexible content presentation companion device 102 is planar in the open position shown above in FIG. 2. Moreover, when the flexible content presentation companion device 102 is in the folded position, the purlins move together to provide full support for the underside major surface of the display 202, which is disposed adjacent to the linkage members 203.

In one or more embodiments, the linkage members 203 can be configured to provide one or more optional mechanical functions as well. For example, in one embodiment, the linkage members 203 provide a stop stage that operates to retain the flexible content presentation companion device 102 in a planar geometric configuration. If the amount of force required to deform the flexible content presentation companion device 102 is, for example, five Newtons ordinarily, the inclusion of a stop stage in the linkage members 203 may require a greater amount of force, such as eleven Newtons, to bend the flexible content presentation companion device 102 from the open position.

In one or more embodiments, the linkage members 203 are not only operable to facilitate bending of the flexible content presentation companion device 102 but also to electronics component enclosure (229) and the end cap (230). Embodiments of the disclosure contemplate that for optimal bending of the flexible display, it can be advantageous for the overall length of the flexible content presentation companion device 102 to change during bending operations.

Illustrating by example, embodiments of the disclosure contemplate that maximum support for the flexible display occurs when the flexible content presentation companion device 102 is shorter in the tent configuration than when in the open position or folded position. This is true because reducing the length during bending allows for the equivalent of a service loop to be defined in the display 202, thereby reducing wear. Accordingly, in one or more embodiments the linkage members 203 are configured to separate when the flexible content presentation companion device 102 is in the axially displaced open position.

In one embodiment, one or more processors operating in the flexible content presentation companion device 102 are operable to detect that a bending operation is occurring by detecting a change in an impedance of the one or more flex sensors (220). The graphic processing unit (212) or other processors operating in the flexible content presentation companion device 102 can detect this bending operation in other ways as well. For example, the touch sensors can detect touch and pressure from the user. Alternatively, proximity sensors can detect the first end (208) and the second end (209) of the flexible content presentation companion device 102 getting closer together. Force sensors can detect an amount of force that the user is applying to the deformable housing 201 as well. The user can input information indicating that the flexible content presentation companion device 102 has been bent using the display 202 or another user interface. Other techniques for detecting that the bending operation has occurred will be obvious to those of ordinary skill in the art having the benefit of this disclosure.

In one or more embodiments, the detected geometric configuration of the flexible content presentation companion device 102 is transmitted back to the compute box (101) so that the visible display portion manager (111) can partition the display 202 of the flexible content presentation companion device 102 as a function of the geometric alignment of the deformable housing 201 resulting from the bending operation. Embodiments of the disclosure contemplate that when a flexible content presentation companion device 102 is equipped with a display 202 that can be deformed, the number of deformations, extent of the deformations, and position of the deformations along the display 202 will change the amount of the display 202 that is visible from the front, visible from the rear, and in the deformed portions. Said differently, the viewable size of the display 202 from each side of the flexible content presentation companion device 102 will vary as a function of the geometric configuration of the flexible content presentation companion device 102. This phenomenon is shown in FIGS. 3-5. Advantageously, embodiments of the disclosure provide applications, methods, and systems that dynamically resize and adjust the interface layouts and content presentations as a function of the geometric configuration of the flexible content presentation companion device 102.

In one or more embodiments, the visible display portion manager (111) of the compute box (101) segments the display 202 of the flexible content presentation companion device 102 into visible and non-visible parts as a function of the geometric configuration of the flexible content presentation companion device 102. Based upon signals from the one or more sensors (221) of the flexible content presentation companion device 102, the visible display portion manager (111) can determine the visible area available on the flexible content presentation companion device 102 as a function of the geometric configuration.

Figure 8:
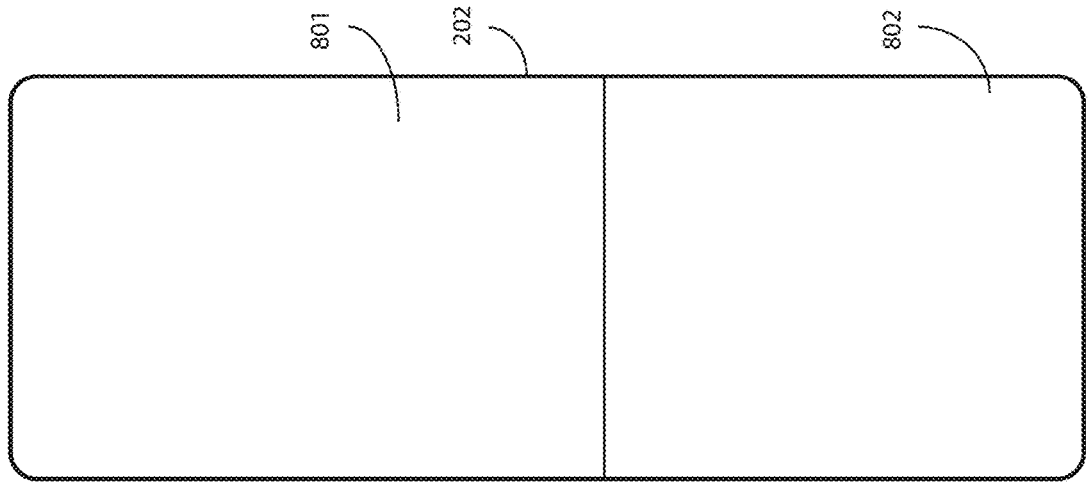
FIG. 8 illustrates visible and non-visible portions of a flexible display of a deformable content presentation companion device when the deformable content presentation companion device is in a third geometric configuration.
Figure 7:
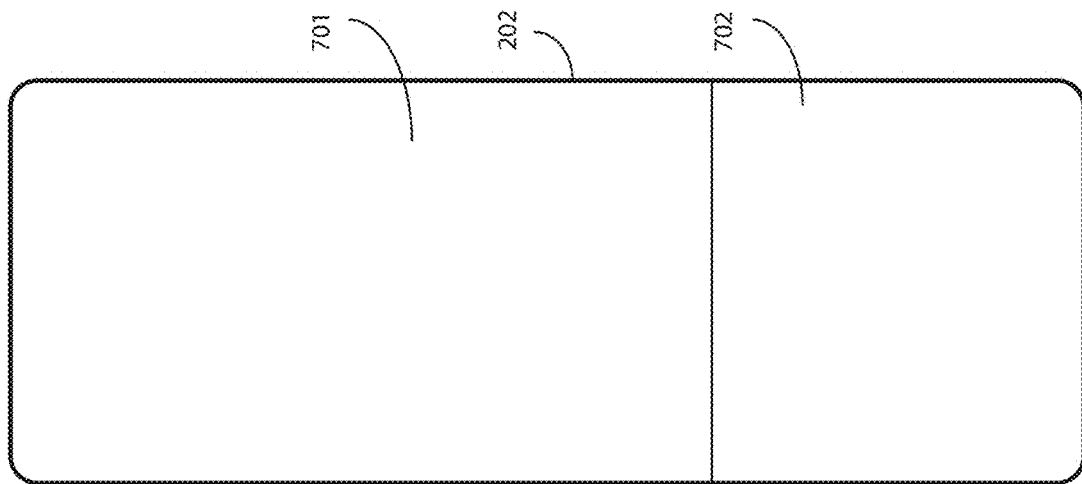
FIG. 7 illustrates visible and non-visible portions of a flexible display of a deformable content presentation companion device when the deformable content presentation companion device is in a second geometric configuration.
Figure 6:
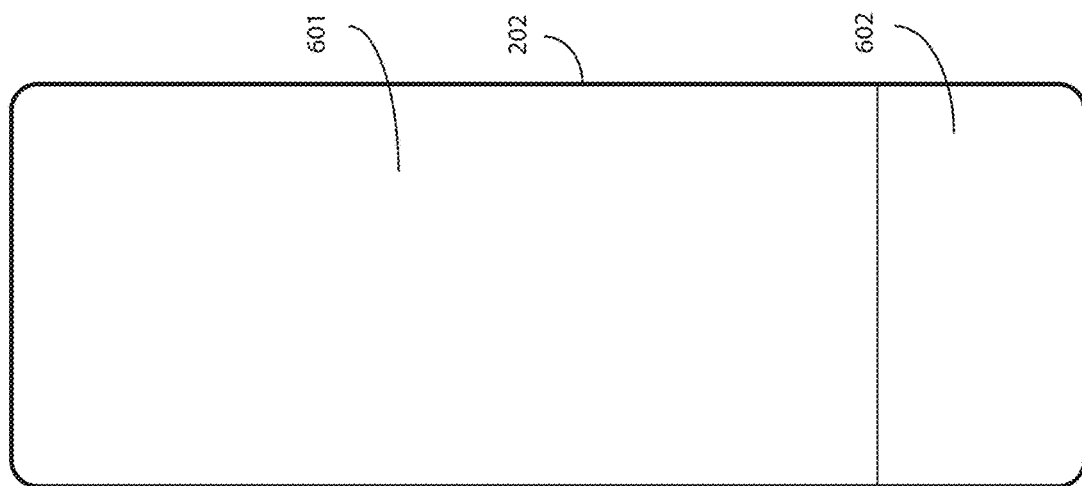
FIG. 6 illustrates visible and non-visible portions of a flexible display of a deformable content presentation companion device when the deformable content presentation companion device is in a first geometric configuration.

Turning now to FIGS. 6-8, illustrated therein are the visible areas 601,701,801 available on the display 202 of the flexible content presentation companion device (102) of FIGS. 3-5, respectively. In each figure, the display 202 of FIGS. 3-5 is shown in an elongated position so that the visible areas 601,701,801 available on the flexible content presentation companion device (102) and non-visible areas 602,702,802 available on the flexible content presentation companion device (102) can be more easily seen. The visible area 601 in FIG. 6 corresponds to the geometric configuration of the flexible content presentation companion device (102) of FIG. 3, while the visible area 701 of FIG. 7 corresponds to the geometric configuration of the flexible content presentation companion device (102) in FIG. 4. The visible area 801 of FIG. 8 corresponds to the geometric configuration of the flexible content presentation companion device (102) in FIG. 5.

As shown, as a general rule, the more the flexible content presentation companion device (102) is deformed, the less visible area remains. However, this rule can be broken. For example, bending the flexible content presentation companion device 102 into a W-shape may leave substantially all of the display 202 visible.

In one or more embodiments, after receiving information from the one or more sensors (221) of the flexible content presentation companion device 102, the visible display portion manager (111) of the compute box (101) knows how the display 202 of the flexible content presentation companion device 102 is deformed and "maps" these visible areas 601,701,801 as distinct and separate content presentation regions. In one or more embodiments, each of these content presentation regions are dynamically remapped as the geometric configuration of the flexible content presentation companion device 102 changes.

Using FIG. 6 as an example, in this embodiment the display 202 has been partitioned into a first portion that is visible (visible area 601) and a second portion (facing into the surface upon which the flexible content presentation companion device 102 rests) that is not visible (non-visible area 602). Each portion is situated on opposite sides of the stand bend (300).

In one or more embodiments, the visible display portion manager (111) of the compute box (101) is operable to cause the content renderer (113) to, when the display 202 is deformed by one or more bends, present content only on the visible areas 601,701,801 of the display 202. The non-visible areas 602,702,802 can be left blank in one or more embodiments. In other embodiments, a decorative picture, corporate logo, banner, wallpaper, or other "placeholder" image can be presented on the non-visible areas 602,702,802 for the benefit of others who may be looking in a different direction from that of a primary user of the electronic device. If, for example, the flexible content presentation companion device (102) of FIG. 4 were turned such that the first end (208) and the second end (209) were resting on a surface, the flexible content presentation companion device (102) would resemble a tent with a first portion of the display 202 visible from a first side of the bend and a second portion of the display 202 visible from a second side of the bend defining visible areas for two people if those two people were sitting on opposite sides of the flexible content presentation companion device (102) and looking in opposite directions. This is a "tent" configuration (400).

Returning now to FIGS. 2-5, the flexible content presentation companion device 102 can operate in many different configurations. A first configuration is an open configuration, such as that shown in FIG. 2, where the deformable housing 201 is flat. A second configuration is a stand configuration 300, such as that shown in FIG. 3, where the deformable housing 201 is deformed to define an angle. A third configuration is the tent configuration 400 shown in FIG. 4. Yet another configuration is a wrapped configuration 500 where the deformable housing 201 is bent over such that the first end (208) and the second end (209) nearly touch. In the wrapped configuration 500, the flexible content presentation companion device 102 can be worn around a wrist.

Referring again to FIG. 1, in one or more embodiments the compute box 101 changes the presentation of content on the display (202) of the flexible content presentation companion device 102 can as a function of its geometry. Illustrating by example, the flexible content presentation companion device 102 might function as a palm-top computer when in the open configuration. By contrast, when in the bent configuration, the flexible content presentation companion device 102 may function as an alarm clock, as the flexible content presentation companion device 102 easily rests on a flat surface. Alternatively, as shown in FIG. 5, the flexible content presentation companion device 102 may be configured as a loop and worn around a wrist. When in a fully folded configuration, the flexible content presentation companion device 102 may function as a smartphone or other device. These functions are illustrative only, as the geometry-based predefined mode of operation could also be any number of other modes, as will be obvious to those of ordinary skill in the art having the benefit of this disclosure.

In one or more embodiments, the one or more processors 104 of the compute box 101, in response to the communication device 105 of the compute box 101 being in communication with the flexible content presentation companion device 102, determine a visible area available on the flexible content presentation companion device 102 as a function of the geometric configuration of the flexible content presentation companion device 102. Illustrating by example, the visible display portion manager 111 may receive signals 114 from the flex sensors (220) of the flexible content presentation companion device 102 using the communication device 105 to determine the visible area available on the flexible content presentation companion device 102 as previously described.

In one or more embodiments, the one or more processors 104 then format content using the content renderer 113 for presentation on the visible area available on the flexible content presentation companion device 102. The one or more processors 104 then cause the communication device 105 to deliver the content to the flexible content presentation companion device 102 for presentation in the visible area available on the flexible content presentation companion device 102.

When the geometric configuration of the flexible content presentation companion device 102 changes, embodiments of the disclosure really shine in that they provide a smooth transition that morphs the content while the geometric configuration is changing and then re-renders the content once the geometric configuration stops changing. Illustrating by example, in one or more embodiments, the one or more processors 104 of the compute box 101, in response to the communication device 105 receiving other signals from the flexible content presentation companion device 102, detect that the geometric configuration of the flexible content presentation companion device 102 is changing. The one or more processors 104 then, optionally using the content presentation animation manager 112, generate a visible display area adjustment animation 115 for the content. In one or more embodiments, the one or more processors 104 then cause the communication device 105 to deliver the visible display area adjustment animation 115 for the content to the flexible content presentation companion device 102 for presentation on a different visible area available on the flexible content presentation companion device 102 that is now present as a result of the geometric configuration of the flexible content presentation companion device 102 changing.

This visible display area adjustment animation 115 can change, morph, and alter the content while the geometric configuration of the flexible content presentation companion device 102 changes in a multitude of ways. In one or more embodiments, the visible display area adjustment animation 115 for the content changes a size of the content. In another embodiment, the visible display area adjustment animation 115 for the content changes an aspect ratio of the content. Other changes, morphs, and adjustments to the content that can be made by the visible display area adjustment animation 115 will be obvious to those of ordinary skill in the art having the benefit of this disclosure.

To illustrate with an example, when the geometric configuration of the flexible content presentation companion device 102 is changing from the substantially flat configuration of FIG. 2 to a deformed configuration, one example of which is shown in FIG. 1, the different visible area available on the flexible content presentation companion device 102 remaining after the deformation is smaller than the visible area available on the flexible content presentation companion device 102 that existed before the deformation. Accordingly, in such an embodiment the visible display area adjustment animation 115 would change the size of the content rendering from a larger content rendering to a smaller content rendering.

In one or more embodiments, the visible display area adjustment animation 115 for the content keeps the content continuously visible on the flexible content presentation companion device 102 without any blanking. If the content were a television show featuring the antics of Buster and Mac, the user could continue watching these antics without gaps, blanks, or losing any of the hilarious content while, for example, bending the flexible content presentation companion device 102 from a flat configuration to a wrist-worn configuration. This is one of the many wonderful advantages offered by embodiments of the disclosure. Others will be described below. Still others will be obvious to those of ordinary skill in the art having the benefit of this disclosure.

When the changing of the geometric configuration of the flexible content presentation companion device 102 stops, so too can the visible display area adjustment animation 115. Illustrating by example, in one or more embodiments the one or more processors 104 of the compute box 101, in response to receiving additional signals from the flexible content presentation companion device 102, detect a cessation of change in the geometric configuration of the flexible content presentation companion device 102. When this occurs, in one or more embodiments the one or more processors 104, optionally using the content renderer 113, generate a new visible display area presentation for the content. The one or more processors 104 then cause the communication device to deliver the new visible display area presentation for the content to the flexible content presentation companion device 102 for presentation in another different visible area available on the flexible content presentation companion device 102 that exists after the change in the geometric configuration of the flexible content presentation companion device 102 ceases and is complete.

In one or more embodiments, the other components and sensors 110 of the compute box 101 comprise a timer 116. In one or more embodiments, the one or more processors 104, in response to the communication device 105 receiving other signals from the flexible content presentation companion device 102, initiate the timer 116.

In one or more embodiments, the one or more processors 104 detect a cessation in the change of the geometric configuration of the flexible content presentation companion device 102 when the timer expires without receipt of additional signals from the flexible content presentation companion device 102 indicating further changes in the geometric configuration of the flexible content presentation companion device 102. This timer initiation gives a "pause" to the action so that the content rendering on the visible area available on the flexible content presentation companion device 102 is not changed more frequently than necessary. In one or more embodiments, the one or more processors 104, optionally using the content renderer 113, generate a new visible display area presentation for the content and cause the communication device 105 to deliver the new visible display area adjustment animation 115 for the content to the flexible content presentation companion device 102 for presentation in another visible area available on the flexible content presentation companion device 102 after the change in the geometric configuration of the flexible content presentation companion device 102 ceases.

As noted above, to keep the flexible content presentation companion device 102 svelte and attractive, in many cases the processing power, energy storage capacity, and other features of the flexible content presentation companion device 102 will be reduced, as smaller batteries and less advanced processors allow for a thinner and lighter device. Embodiments of the disclosure understand this, and also contemplate that it can be less than desirable to render a relatively processor intensive content such as a visible display area adjustment animation 115 when the battery in the flexible content presentation companion device 102 is about to die.

Accordingly, in one or more embodiments the one or more processors 104 of the compute box 101, in response to receiving other signals from the flexible content presentation companion device 102, determine an energy storage capacity of the flexible content presentation companion device 102. In one or more embodiments, generation of the visible display area adjustment animation 115 for the content and causation of the communication device 105 delivering the visible display area adjustment animation 115 for the content to the flexible content presentation companion device 102 for presentation in the different visible area available on the flexible content presentation companion device 102 as a result of the geometric configuration of the flexible content presentation companion device 102 changing only occurs when the energy storage capacity of the flexible content presentation companion device 102 is above a predefined energy storage threshold. If the energy storage capacity of the energy storage devices in the flexible content presentation companion device 102 were one amp-hour, for example, the predefined energy storage threshold might be a quarter amp-hour, and so forth.

To further conserve this precious energy in the flexible content presentation companion device 102, in one or more embodiments the electronic communication between the compute box 101 and the flexible content presentation companion device 102 at least periodically discontinues between the signals received from the flexible content presentation companion device 102 indicating an initiation of a geometric configuration change and other signals received from the flexible content presentation companion device 102 indicating that the change in the geometric configuration has ceased.

In effect, when the geometric configuration of the flexible content presentation companion device 102 changes to reduce or enlarge the visible area of the display 202 of the flexible content presentation companion device 102, the one or more processors 104 of the compute box 101 adjust a rendering of the content to reduce or enlarge the content in accordance with a reduction or an enlargement of the visible area of the display 202. This can be done by generating a visible display area adjustment animation 115 for the content while the visible area of the display 202 of the flexible content presentation companion device 102 is changing. Thus, if someone is watching the antics of Buster and Mac while the flexible content presentation companion device 102 is in a flat configuration, they won't miss any of the action when changing the flexible content presentation companion device 102 to a wrapped configuration to make it a wearable electronic device suitable for being worn on a wrist.

Figure 9:
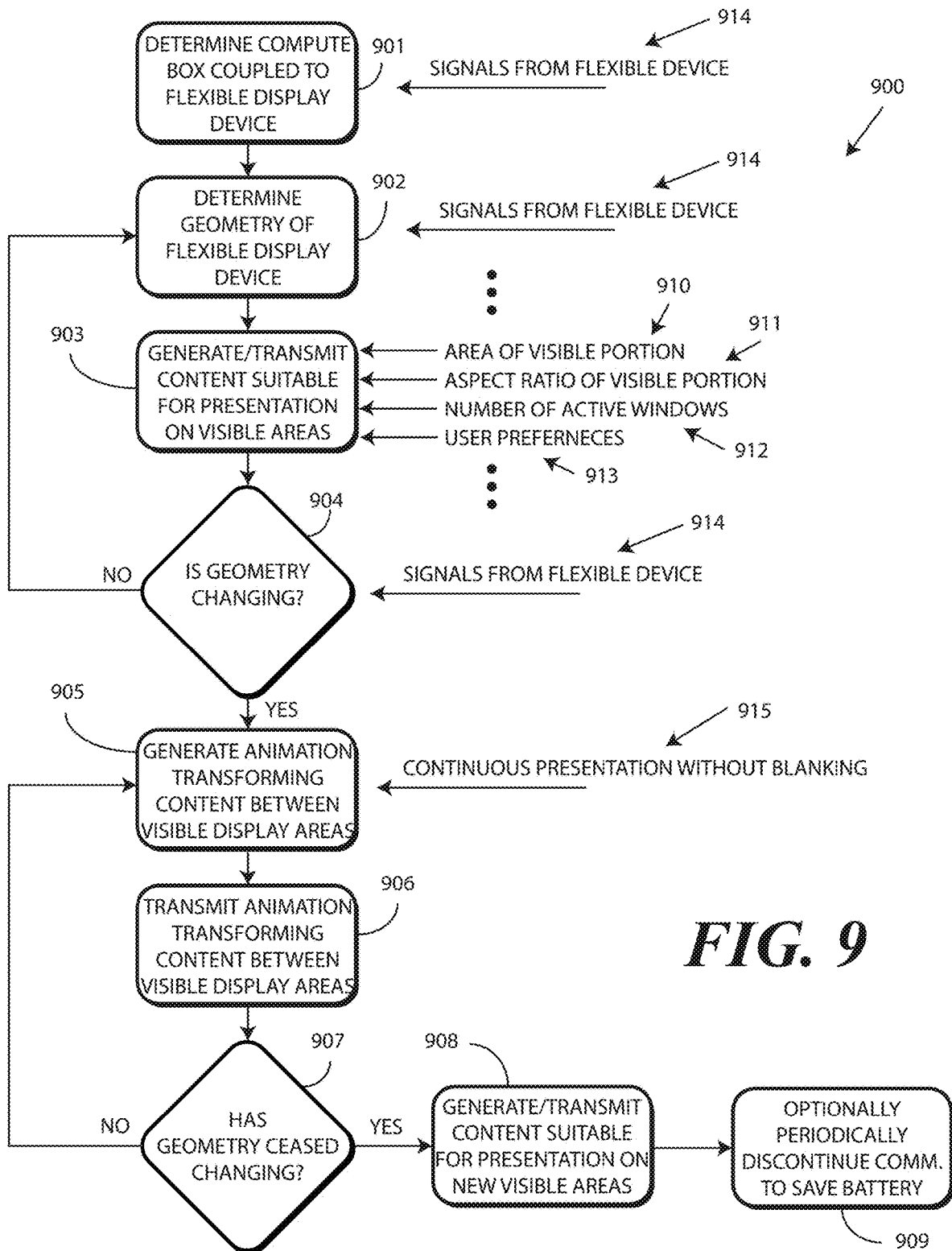
FIG. 9 illustrates one explanatory method in accordance with one or more embodiments of the disclosure.

Turning now to FIG. 9, illustrated therein is one explanatory method 900 in accordance with one or more embodiments of the disclosure. At step 901, the method detects, with a communication device if an electronic device from signals 914 received from a flexible content presentation companion device, that the communication device is in electronic communication with the flexible content presentation companion device. At step 902, the method 900 detects, with the communication device of the electronic device from the signals 914 received from the flexible content presentation companion device, a geometric configuration of the flexible content presentation companion device.

At step 903, the method 900 renders, by one or more processors of the electronic device, content for presentation on a visible portion of a flexible display of the flexible content presentation companion device defined by the geometric configuration of the flexible content presentation companion device. In one or more embodiments, the rendering formats the content such that it fits a visible area 910 available on the flexible content presentation companion device. The rendering may ensure that the content matches an aspect ratio 911 defined by the visible area 910 available on the flexible content presentation companion device. If multiple windows are open on the visible area 910 available on the flexible content presentation companion device, the rendering may result in content situated an area 912 defined by one of those windows. Of course, a user can define one or more user preferences 913 indicating how content should be rendered for a particular geometric configuration as well.

Decision 904 determines, again from signals 914 from the flexible content presentation companion device, whether the geometric configuration of the flexible content presentation companion device is changing. Where it is not, the method 900 returns to step 902.

However, when the geometric configuration of the flexible content presentation companion device is changing, as determined at decision 904, step 905 in response again renders the content to create adapted content for presentation on another visible portion of the flexible display of the flexible content presentation companion device. In one or more embodiments, this new formatting is different in that it is suited to a different visible portion of the flexible content presentation companion device due to the fact that the geometric configuration of the flexible content presentation companion device has changed. In one or more embodiments, step 905 continues as long as the geometric configuration of the flexible content presentation companion device is changing. Illustrating by example, in one or more embodiments the visible portion of the flexible display of the content presentation companion device is smaller than the visible portion of the flexible display of the flexible content presentation companion device when the changes in the geometric configuration of the flexible content presentation companion device deform the flexible content presentation companion device.

In one or more embodiments, this new rendering occurring at step 905 includes the generation of a visible display area adjustment animation for the content. In one or more embodiments, the visible display area adjustment animation causes the content to morph from the visible portion of the flexible display of the flexible content presentation companion device prior to the deformation changing the geometric configuration to the new visible portion of the flexible display of the flexible content presentation companion device that remains after the deformation without blanking 915. At step 906, the visible display area adjustment animation and new content rendering are transmitted to the flexible content presentation companion device.

Decision 907 then determines whether the geometric configuration has ceased changing. This can be done in a variety of ways.

Figure 10:
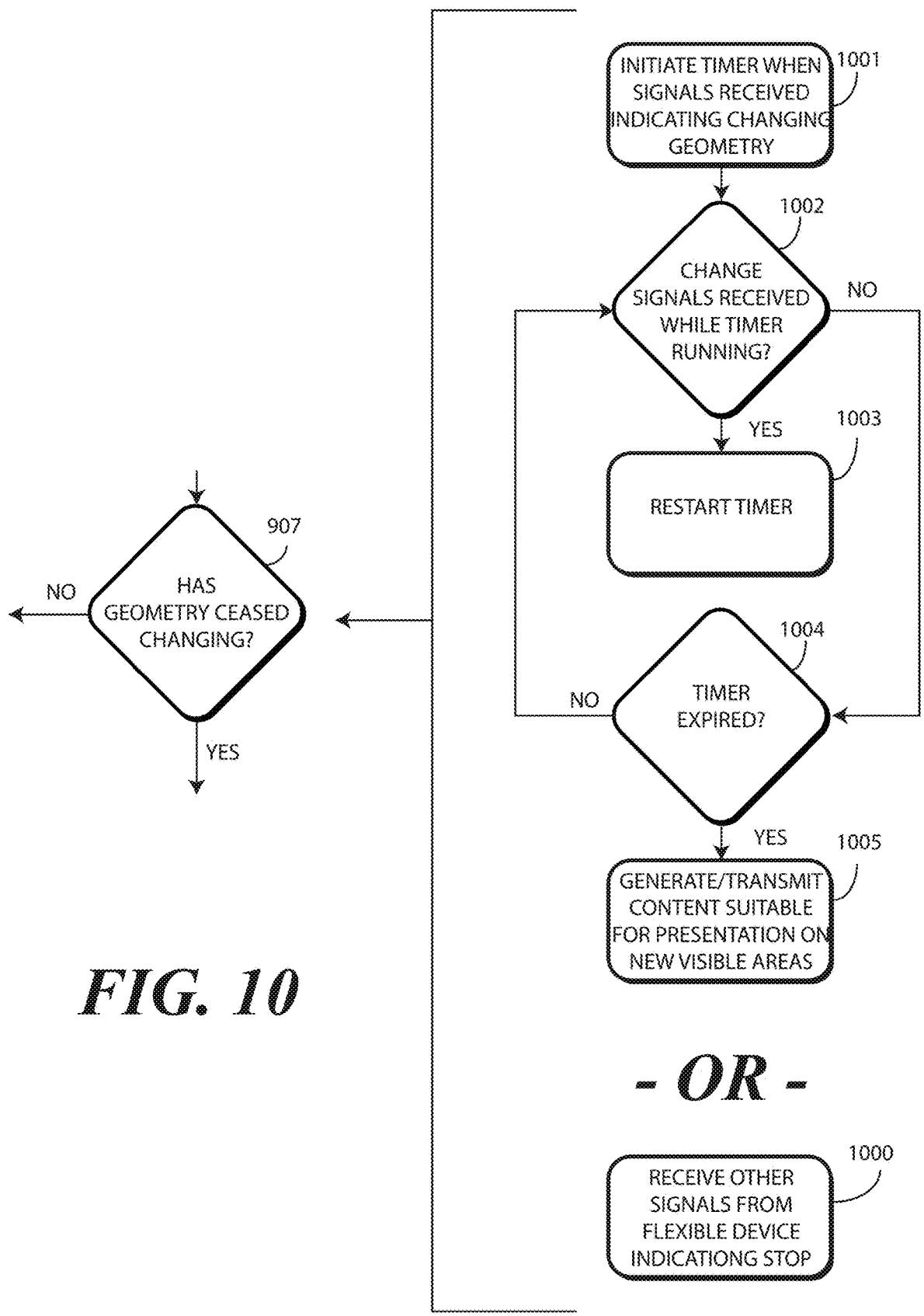
FIG. 10 illustrates one or more method steps in accordance with one or more embodiments of the disclosure.

Turning now briefly to FIG. 10, illustrated therein are some illustrative techniques for determining, at decision 907 of method (900), whether the geometric configuration of the flexible content presentation companion device has ceased changing. These techniques are explanatory only, as numerous others will be obvious to those of ordinary skill in the art having the benefit of this disclosure.

In the simplest of embodiments, decision 907 is made in response to receiving other signals from the flexible content presentation companion device at step 1000. Illustrating by example, the flex sensors of a flexible content presentation companion device may cease detecting deformations in the device housing or flexible display of the flexible content presentation companion device. When this occurs, the communication device of the flexible content presentation companion device can simply send signals to the electronic device indicating that the changes in geometric configuration have ceased.

In other embodiments, the electronic device makes the decision internally by using a timer. Specifically, at step 1001 one or more processors of the electronic device initiate a timer when the geometric configuration of the flexible content presentation companion device starts changing. Decision 1002 then determines whether additional signals indicating additional changes have been received while the timer is running Where they have, the timer is restarted at step 1003.

Otherwise, decision 1004 determines whether the time has expired before any additional signals are received from the flexible content presentation companion device indicating that additional changes have occurred in the geometric configuration. Where the timer has expired, at step 1005 decision 907 determines that the changes in the geometric configuration have ceased, and accordingly transmits a new rendering of the content to fit the new visible portions of the flexible display of the flexible content presentation companion device that remain in the new geometric configuration.

Turning now back to FIG. 9, at step 908 the method 900 transmits a new rendering of the content to fit the new visible portions of the flexible display of the flexible content presentation companion device that remain in the new geometric configuration. In one or more embodiments, step 908 also comprises ceasing the re-rendering of the content to create the adapted content for presentation on the new visible portion of the flexible display of the flexible content presentation companion device in response to the cessation of changing in the geometric configuration of the flexible content presentation companion device.

As noted above, it can be desirable to limit current drain in the energy storage device of the flexible content presentation companion device as much as possible. Where this is the case, step 909 can comprise the communication device of the electronic device and the flexible content presentation companion device at least periodically discontinuing communication between the signals received from the flexible content presentation companion device indicating that the geometric configuration is changing, and the other signals received from the flexible content presentation companion device indicating that the geometric configuration has ceased changing. This periodically ceases the flexible content presentation companion device from being polled and having to communicate, thereby conserving power in the flexible content presentation companion device.

As will be illustrated below with reference to FIG. 14, a compute box configured in accordance with embodiments of the disclosure can be used with a wide variety of devices. While some may be flexible content presentation companion device, others may have rigid displays and device housings. The compute box can still communicate with these non-flexible content presentation companion devices. Additionally, to save power in any content presentation companion device, or to supplement processing power for any connected content presentation companion device, the one or more processors of the compute box can provide computing resources for non-flexible content presentation companion devices or other electronic devices as well.

Figure 11:
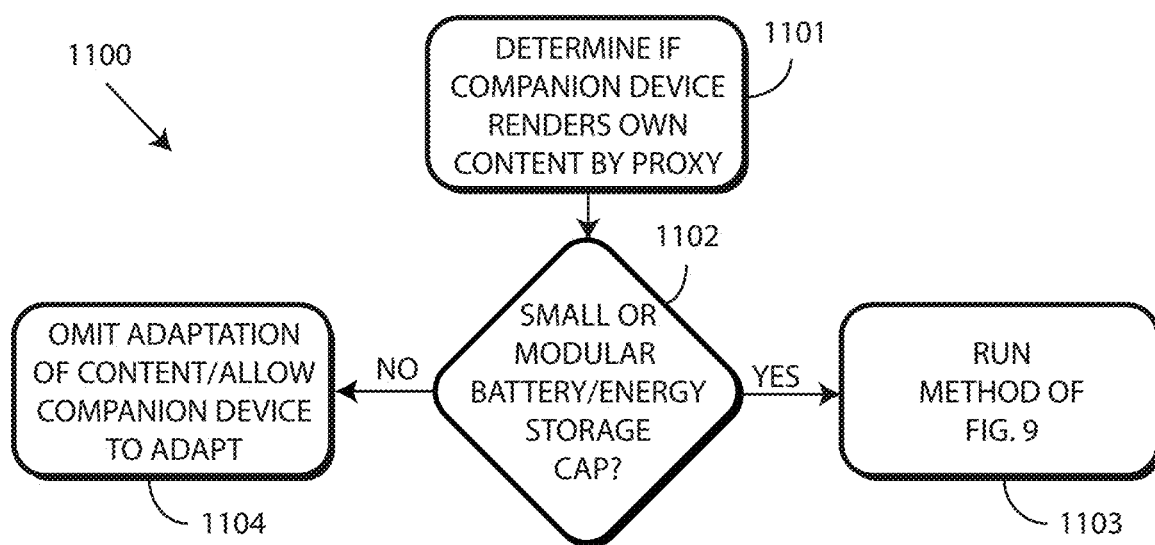
FIG. 11 illustrates one or more method steps in accordance with one or more embodiments of the disclosure.

Turning now to FIG. 11, illustrated therein is a simplified method 1100 for quickly determining what type of content presentation companion device is connected to the content presentation companion device. While signals conveying device type, resource requests, processing power, and so forth can be transmitted from the content presentation companion device to the compute box, the method 1100 of FIG. 11 allows a "down and dirty" way for the compute box to determine whether to provide computing resources and, in particular, computing resources providing visible display area adjustment animation that morph content when a device geometric configuration changes, for another electronic device.

Step 1101 initiates a proxy determination regarding whether a connected content presentation companion device renders its own content, thereby rendering the method (900) of FIG. 9 unnecessary, or whether it needs the processing power of the compute box to perform the method (900) of FIG. 9 to do the same. This is done, in one or more embodiments, at decision 1102 by determining if the content presentation companion device has a smaller than normal energy storage device or energy storage capacity. As noted above, in deformable content presentation companion devices, it is frequently the case that their small, thin, and flexible form factors simply will not allow for full size batteries or other energy storage devices. Accordingly, decision 1102 determines whether there is a reduced size energy storage device in the content presentation companion device. Decision 1102 can also determine whether there is a modular energy storage device architecture in the content presentation companion device. In the illustrative flexible content presentation companion device of FIG. 1, each hinge had its own energy storage device situated therein, thereby giving rise to a modular energy storage device architecture.

Where either condition is true, step 1103 comprises running the method (900) of FIG. 9 to adjust a rendering of the content to reduce or enlarge the content in accordance with a reduction or enlargement of the visible area of the flexible display of the content presentation companion device. Otherwise, step 1104 comprises omitting this adaptation and instead allowing the content presentation companion device to perform any re-rendering on its own.

Figure 12:
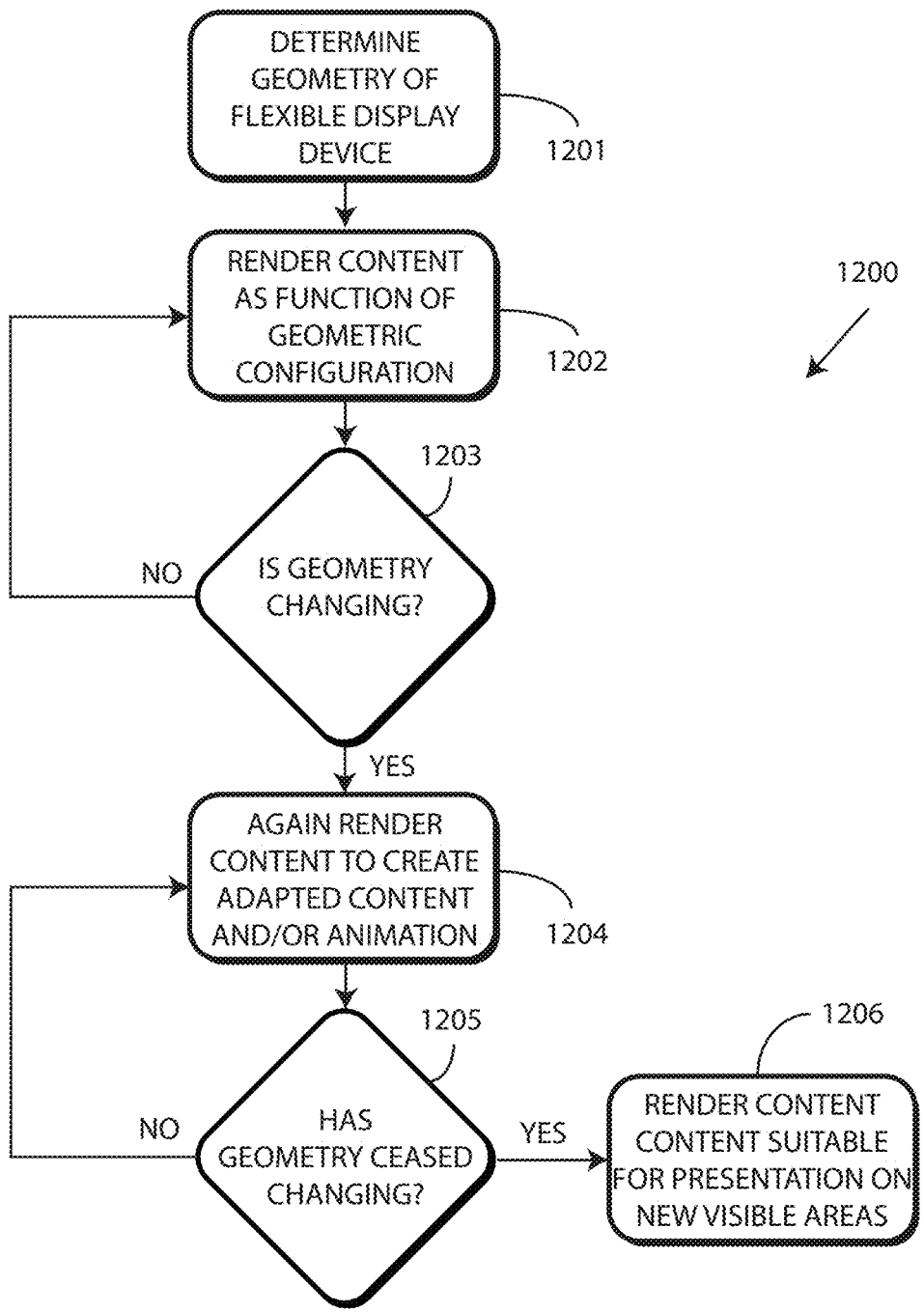
FIG. 12 illustrates another explanatory method in accordance with one or more embodiments of the disclosure.

Turning now to FIG. 12, illustrated therein is another method 1200 in accordance with one or more embodiments of the disclosure. Beginning at step 1201, a communication device of a compute box detects, with a communication device from signals received from a flexible content presentation companion device, a geometric configuration of the flexible content presentation companion device. Step 1202 then comprises rendering, by one or more processors of the compute box, content for presentation on a visible portion of a flexible display of the flexible content presentation companion device defined by the geometric configuration of the flexible content presentation companion device determined at step 1201.

Decision 1203 then detects, with the communication device of the compute box from other signals received from the flexible content presentation companion device, whether the geometric configuration of the flexible content presentation companion device is changing. If it is not, the method 1200 returns to step 1202. However, if the geometric configuration is indeed changing, step 1204 again renders, in response to the geometric of the flexible content presentation companion device changing, the content to create adapted content for presentation on another visible portion of the flexible display of the flexible content presentation companion device that is different from the visible portion of the flexible content presentation companion device due to the geometric configuration of the flexible content presentation companion device changing. This step 1204 can include the generation of a visible display area adjustment animation, which is transmitted to the flexible content presentation companion device while the geometric configuration of the flexible content presentation companion device is changing.

Decision 1205 determines whether the geometric configuration of the flexible content presentation companion device has ceased changing. In one or more embodiments, step 1204 continues as long as the geometric configuration of the flexible content presentation companion device is changing. Accordingly, where the geometric configuration continues to change, the method 1200 returns to step 1204. However, when the geometric configuration ceases changing, step 1206 comprises ceasing the re-rendering of step 1204 of the content to create the adapted content for presentation on the new visible portion of the flexible display of the flexible content presentation companion device in response to cessation of the changing of the geometric configuration of the flexible content presentation companion device.

Figure 13:
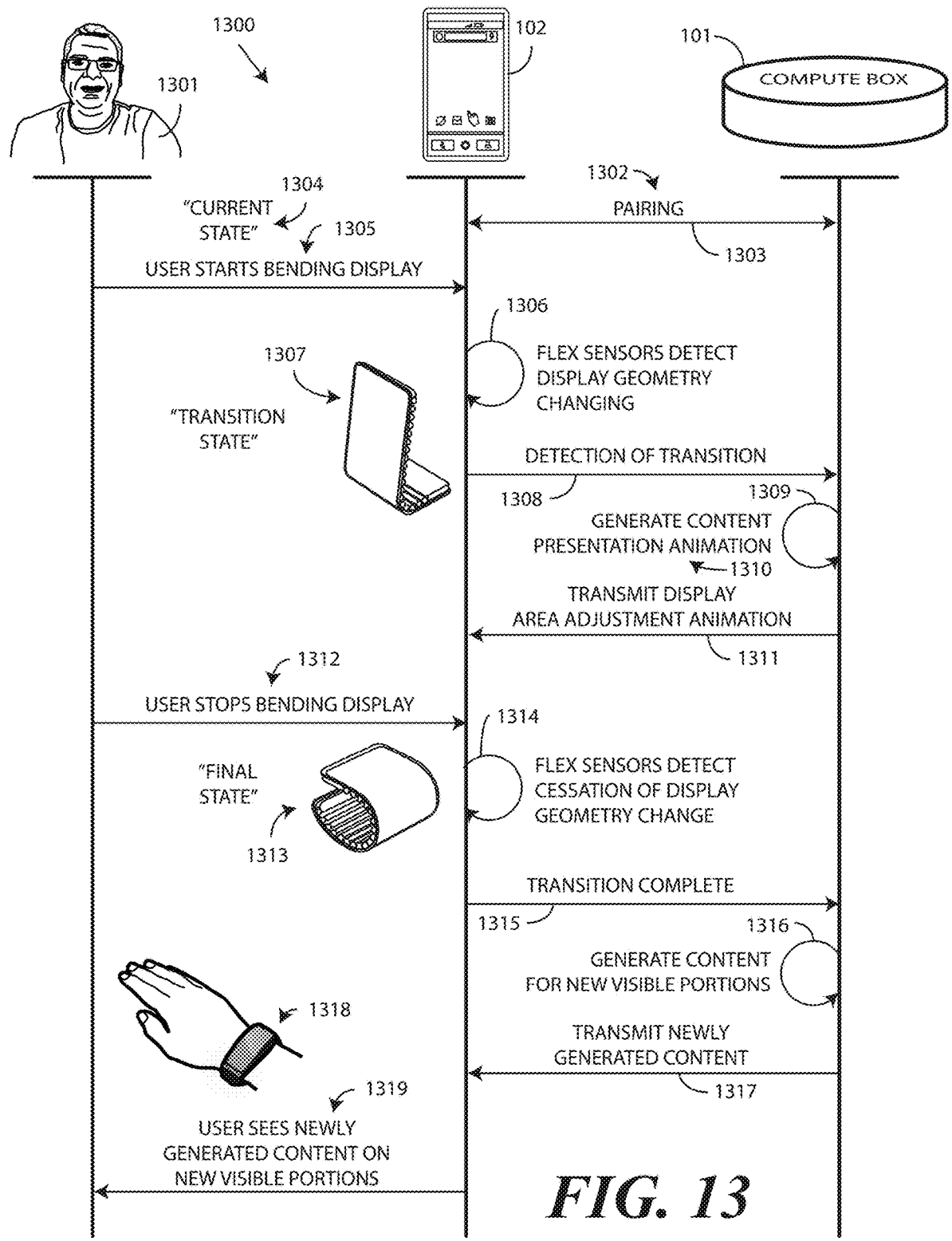
FIG. 13 illustrates a system diagram of one explanatory system in accordance with one or more embodiments of the disclosure.

Turning now to FIG. 13, illustrated therein is an action and signal flow diagram 1300 that illustrates how various embodiments of the disclosure work when a user 1301 interacts with a flexible content presentation companion device 102 for which a compute box 101 is providing computing resources. While the methods described above have illustrated the operation of most of the action and signal flow diagram 1300, the operations set forth in the action and signal flow diagram 1300 help to see how a visible display area adjustment animation 1310 works to morph content during a transition phase between an initial geometric configuration and a final geometric configuration when the user 1301 is bending or deforming the flexible content presentation companion device 102.

To begin, the flexible content presentation companion device 102 and the compute box 101 perform a pairing operation 1302 by exchanging electronic communication signals 1303. In one or more embodiments, the pairing operation 1302 establishes a peer-to-peer Miracast.sup.™ communication connection between the compute box 101 and the flexible content presentation companion device 102.

In this illustrative action and signal flow diagram 1300, the initial state 1304 of the flexible content presentation companion device 102 is with the flexible content presentation companion device 102 being substantially flat as shown at the top of the action and signal flow diagram 1300. However, in this example the user 1301 wants to wear the flexible content presentation companion device 102 like a watch on his wrist. Accordingly, the user starts bending 1305 the flexible content presentation companion device 102.

One or more sensors then detect 1306 the geometric configuration of the flexible content presentation companion device 102 changing. In one or more embodiments, a communication device of the flexible content presentation companion device 102 then transmits signals 1308 to the compute box 101 indicating that the flexible content presentation companion device 102 is being deformed. In one or more embodiments, the compute box then generates 1309 a visible display area adjustment animation 1310 that morphs the content as the geometric configuration is changing and transmits 1311 the visible display area adjustment animation 1310 to the flexible content presentation companion device 102 for presentation on the display.

Embodiments of the disclosure contemplate that the flexible content presentation companion device 102 does not instantly change from the flat configuration shown at the top of the action and signal flow diagram 1300 to the wrapped configuration 1318 shown at the bottom of the diagram. Instead, it passes through a transition state 1307 where it is partially deformed en route to becoming the wrapped configuration 1318. Accordingly, in one or more embodiments this generation 1309 of the visible display area adjustment animation 1310 and transmission of the same to the flexible content presentation companion device 102 continues until the changing geometric configuration ceases.

Once the user 1301 stops bending 1312 the flexible content presentation companion device 102, it reaches a final state 1313. The one or more sensors of the flexible content presentation companion device 102 then detect 1314 this cessation of any changes in the geometric configuration and transmit other signals 1315 to the compute box 101 indicating the same. Accordingly, one or more processors of the compute box 101 then render 1316 the content to create adapted content for presentation on another visible portion of the flexible content presentation companion device 102 that is different from the visible portion that existed when the flexible content presentation companion device 102 was in the initial state 1304. As shown in FIG. 13, the visible portion of the flexible display of the flexible content presentation companion device 102 is smaller when the flexible content presentation companion device 102 is in the final state 1313 than it was when the flexible content presentation companion device 102 was in the initial state 1304.

This rendering can then be transmitted 1317 to the flexible content presentation companion device 102. The user 1301 is then able to see the newly rendered content 1319 on the visible portions of the flexible display of the flexible content presentation companion device 102. The action and signal flow diagram 1300 can repeat each time the geometric configuration of the flexible content presentation companion device 102 is changed.

While examples to this point have been directed to single flexible content presentation companion device operating on a one-to-one basis with a single compute box, embodiments of the disclosure are not so limited. Indeed, compute boxes configured in accordance with embodiments of the disclosure can be used with multiple content presentation companion devices, regardless of whether they are flexible. Illustrating by example, a parent may have a single compute box and single flexible content presentation companion device but may issue flexible content presentation companion devices and/or non-flexible content presentation companion devices to their kids. The whole family can then enjoy computing bliss using a single compute box that supports a plurality of content presentation companion devices. Turning now to FIG. 14, illustrated therein is just one such system 1400.

Figure 14:
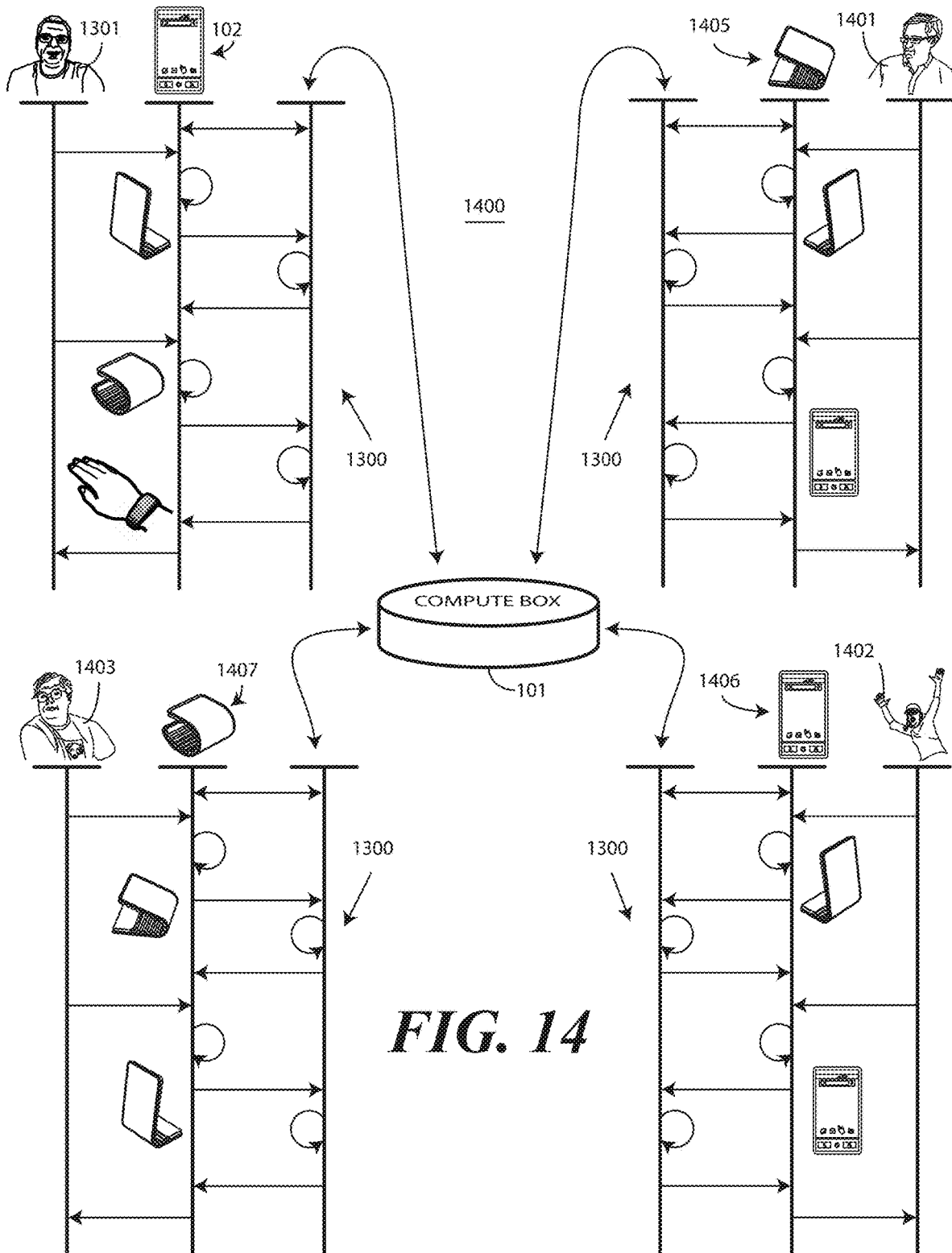
FIG. 14 illustrates another system diagram of another explanatory system in accordance with one or more embodiments of the disclosure.

In the system 1400 of FIG. 14, a single compute box 101 supports four different flexible content presentation companion devices. User 1301 uses flexible content presentation companion device 102, while user 1401 uses flexible content presentation companion device 1405. User 1402 uses flexible content presentation companion device 1406, while user 1403 uses flexible content presentation companion device 1407.

Each user 1301,1401,1402,1403 executes a bending operation the compute box 101 provides computing resources for their respective flexible content presentation companion device 102,1405,1406,1407. User 1301 transforms his flexible content presentation companion device 102 from a flat configuration to a wrapped configuration, while user 1401 transforms his flexible content presentation companion device from a tent configuration to a flat configuration. User 1402 transforms her flexible content presentation companion device 1406 from a flat configuration to a stand configuration, but then changes her mind and transforms the flexible content presentation companion device 1406 back to the flat configuration. User 1403 transforms his flexible content presentation companion device 1407 from a wrapped configuration to a stand configuration, and so forth.

The action and signal flow diagram 1300 from FIG. 13 is executed for each user 1301,1401,1402,1403. Accordingly, one or more processors of the compute box 101, in response to its communication device being electronically in communication with a flexible content presentation companion device, e.g., flexible content presentation companion device 102, and at least one flexible content presentation companion device, e.g., flexible content presentation companion devices 1405,1406,1407, determines a geometric configuration of each of the flexible content presentation companion devices 102,1405,1406,1407 and formats content for each flexible content presentation companion device 102,1405, 1406,1407 as a function of the geometric configuration of each flexible content presentation companion device 102, 1405,1406,1407.

In this illustration, each flexible content presentation companion device 102,1405,1406,1407 comprises a flexible display, and the geometric configuration of each flexible content presentation companion device 102,1405,1406,1407 defines a visible are of each flexible display. User 1301 can initially see more area than user 1401 or user 1403, as shown. This occurs because the initial geometric configuration of flexible content presentation companion device 102, flexible content presentation companion device 1405, and flexible content presentation companion device 1407 are different.

As previously described, the action and signal flow diagram 1300 of FIG. 13 results in the one or more processors of the compute box 101 generating and transmitting to the flexible content presentation companion devices 102,1405, 1406,1407 using the communication device of the compute box 101, a visible display area adjustment animation when the geometric configuration of each flexible content presentation companion device 102,1405,1406,1407 changes. Since the changes in, for example, the interim states of flexible content presentation companion device 1407 and flexible content presentation companion device 1406 are different, the visible display area adjustment animation transmitted to each flexible content presentation companion device 1406,1407 will be different. What's more, since each user 1301,1401,1402,1403 is operating their flexible content presentation companion device 102,1405,1406,1407 individually, the content the compute box 101 delivers to each flexible content presentation companion device 102,1405, 1406,1407 will be different, thus further differentiating each visible display area adjustment animation.

As previously described, the action and signal flow diagram 1300 of FIG. 13 results in the one or more processors of the compute box 101 generating and transmitting to each flexible content presentation companion device 102,1405, 1406,1407 using the communication device of the compute box 101, a new visible display area presentation for the content when changes in the geometric configuration of each flexible content presentation companion device 102,1405, 1406,1407 ceases. As with the visible display area adjustment animation, the visible display area presentation for each flexible content presentation companion device 102, 1405,1406,1407 will be different in one or more embodiments.

While the system 1400 of FIG. 14 involves a compute box 101 operating with flexible content presentation companion devices 102,1405,1406,1407, embodiments of the disclosure are not so limited. Compute boxes configured in accordance with embodiments of the disclosure can be used with non-flexible content presentation companion devices as well. Turning now to FIG. illustrated therein is one such system.

Figure 15:
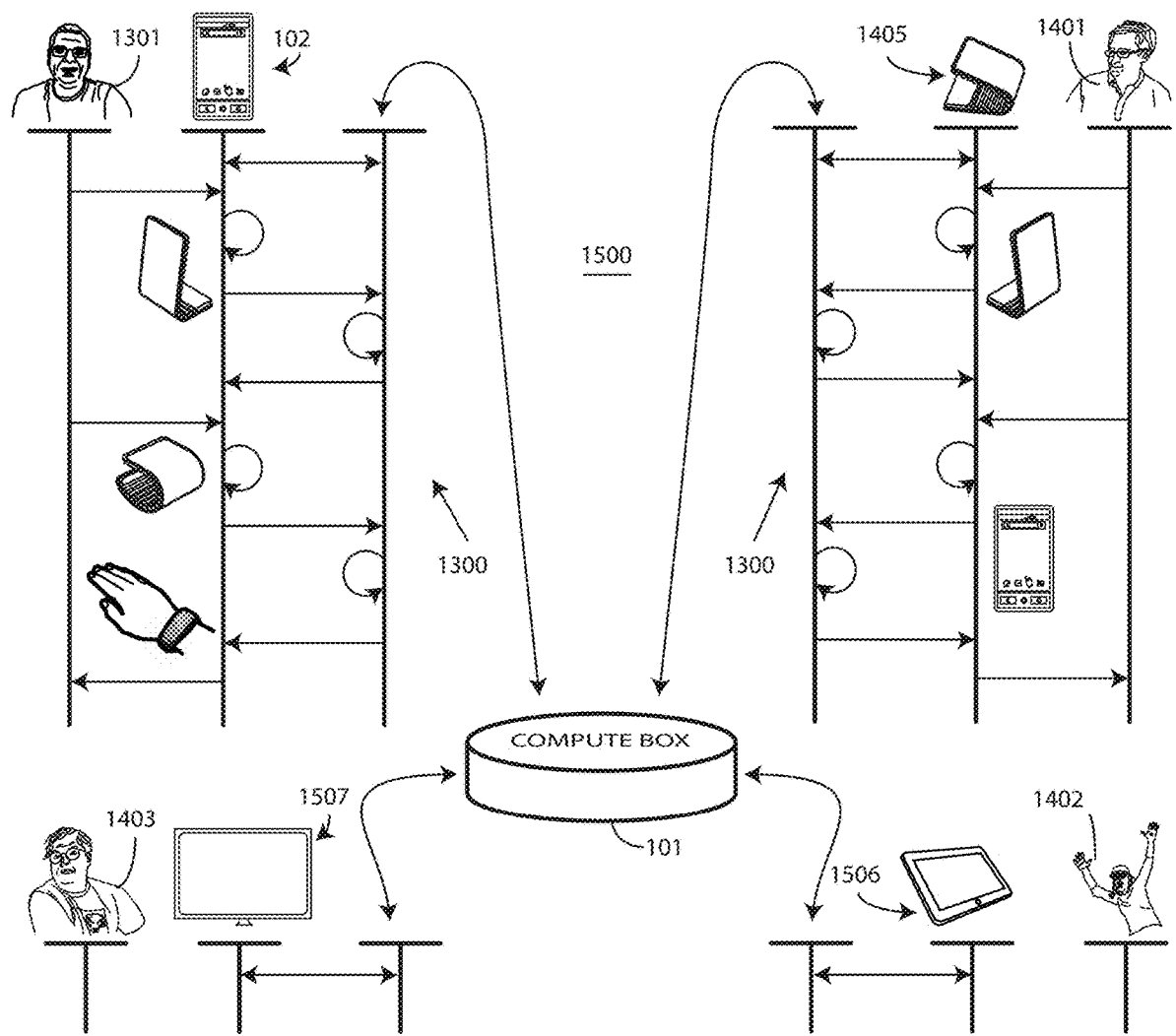
FIG. 15 illustrates still another system diagram of still another explanatory system in accordance with one or more embodiments of the disclosure.

In the system 1500 of FIG. 15, a single compute box 101 supports four different flexible content presentation companion devices. User 1301 uses flexible content presentation companion device 102, while user 1401 uses flexible content presentation companion device 1405. User 1402 uses non-flexible content presentation companion device 1506, while user 1403 uses non-flexible content presentation companion device 1507.

While the compute box 101 provides computing resources for non-flexible content presentation companion device 1506 and non-flexible content presentation companion device 1507, it does not perform the action and signal flow diagram 1300 of FIG. 13 for these devices. Instead, the compute box 101 allows each non-flexible content presentation companion device 1506,1507 to perform its own rendering operations. The method (1100) of FIG. 11 could be used to identify the non-flexible content presentation companion devices 1506,1507 as being non-deformable. However, other techniques for doing so will be obvious to those of ordinary skill in the art having the benefit of this disclosure.

The users 1301,1401 of the flexible devices again execute bending operations while the compute box 101 provides computing resources for their respective flexible content presentation companion device 102,1405. User 1301 transforms his flexible content presentation companion device 102 from a flat configuration to a wrapped configuration, while user 1401 transforms his flexible content presentation companion device from a tent configuration to a flat configuration.

The action and signal flow diagram 1300 from FIG. 13 is executed for each user 1301,1401 having a device that is deformable. Accordingly, a communication device of the compute box 101 detects, from signals received by the communication device, a geometric configuration of flexible content presentation companion device 102 that defines a visible area of a flexible display carried by the flexible content presentation companion device 102 and another geometric configuration of another flexible content presentation companion device 1405 defining another visible area of another flexible display carried by the another flexible content presentation companion device. The one or more processors of the compute box 101 then render content for presentation on the visible area of the flexible display carried by the flexible content presentation companion device 102 and other content for presentation on the visible area of the other flexible display carried by the other flexible content presentation companion device 1405.

The action and signal flow diagram 1300 further results in the one or more processors of the compute box 101 detecting, with the communication device from other signals received by the communication device, one or both of a change in the geometric configuration of the flexible content presentation companion device 102 and/or another change in the other geometric configuration of another flexible content presentation companion device 1405. In response, the one or more processors of the compute box 101 again render the content to create adapted content for presentation on a different visible portion of the flexible display carried by the flexible content presentation companion device 102 created by the change in the geometric configuration of the flexible content presentation companion device 102 and/or again render the other content to create another adapted content for presentation on another different visible portion of the other flexible display carried by the other flexible content presentation companion device 1405 created by the another change in the another geometric configuration of the another flexible content presentation companion device.

The action and signal flow diagram 1300 of FIG. 13 also results in the communication device of the compute box 101 transmitting the adapted content to the flexible content presentation companion device 102 and/or transmitting, with the communication device, the other adapted content to the other flexible content presentation companion device 1405. Since the final states of the flexible content presentation companion device 102 and the other flexible content presentation companion device 1405 are different, the adapted content and the other adapted content occupy different amounts of the flexible display and the other flexible display, respectively.

Figure 16:
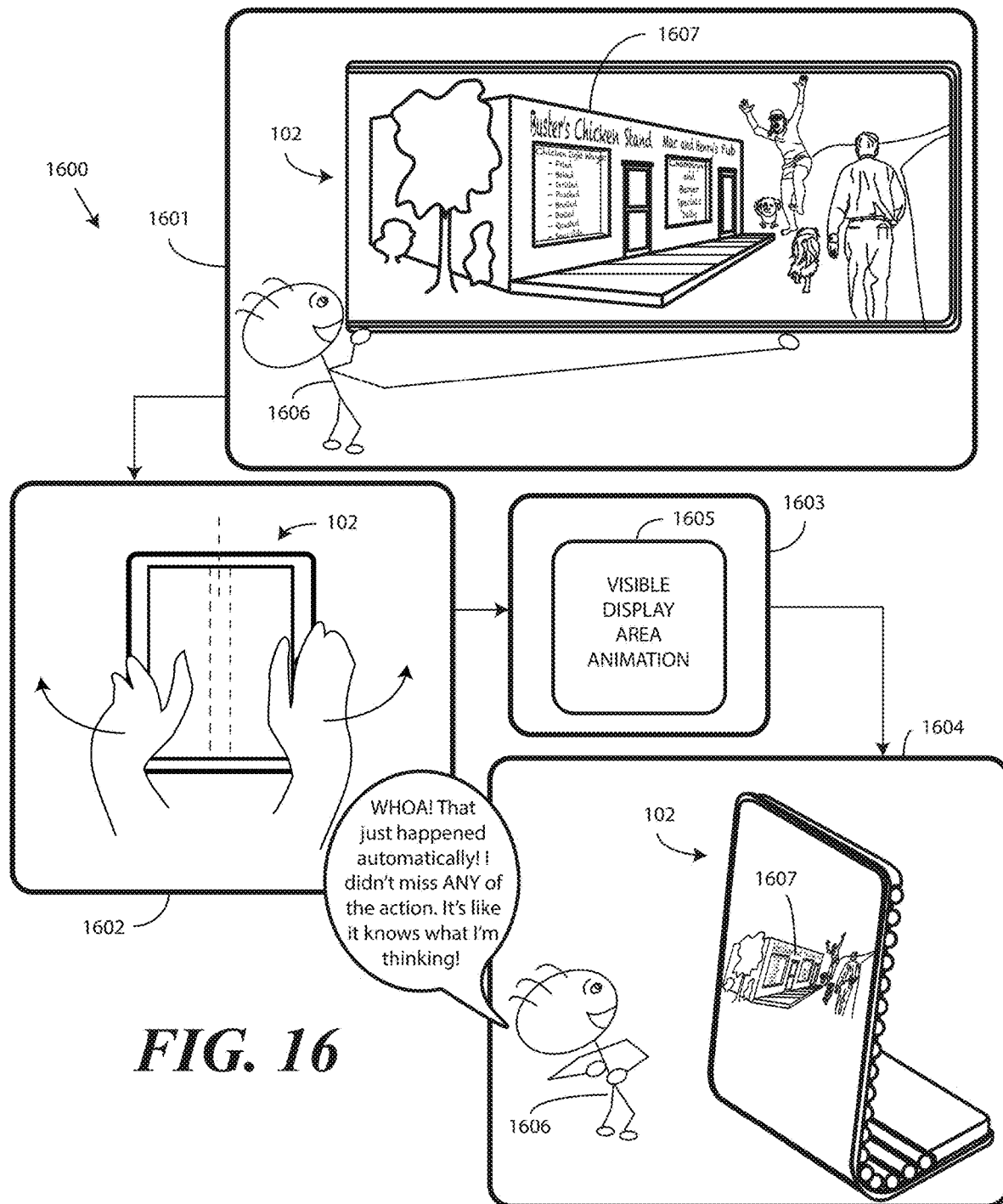
FIG. 16 illustrates another method in accordance with one or more embodiments of the disclosure.

To illustrate how amazing embodiments of the disclosure are for a user and their experience using an electronic device, FIG. 16 presents a method 1600 in which a user 1606 deforms a flexible content presentation companion device 102 for which a compute box (101) is providing computing resources while the flexible content presentation companion device 102 is presenting content 1607.

As shown at step 1601, the user 1606 is using a flexible content presentation companion device 102 in a flat geometric configuration, while oriented in a landscape orientation, to consume content 1607 in the form of a movie. As was the case in the system (1500) of FIG. 15, the compute box (101) may be providing computing resources for other content presentation companion devices, be they flexible or not. The content 1607 presented on the display of the flexible content presentation companion device 102 is received from the compute box (101) after rendering and is presented on a visible area defined by the geometric configuration of the flexible content presentation companion device 102.

Tired of holding the flexible content presentation companion device 102, the user 1606 executes a bending operation at step 1602 to transform the flexible content presentation companion device 102 from the flat geometric configuration to a stand geometric configuration. At step 1603, the compute box (101) adjusts a rendering of the content 1607 a function of changes to the geometric configuration. In this illustrative example, the one or more processors of the compute box (101) adjust the rendering of the content 1607 by animating the content with a visible display area adjustment animation 1605. This morphs and transforms the content 1607 along the visible areas of the flexible display of the flexible content presentation companion device 102 without blanking, cropping, or otherwise losing information.

As shown at step 1604, the content 1607 has been morphed and transformed for seamless presentation on a new visible area defined by the stand configuration. The user is amazed and delighted having not had to miss any of the movie when bending the flexible content presentation companion device 102.

Figure 17:
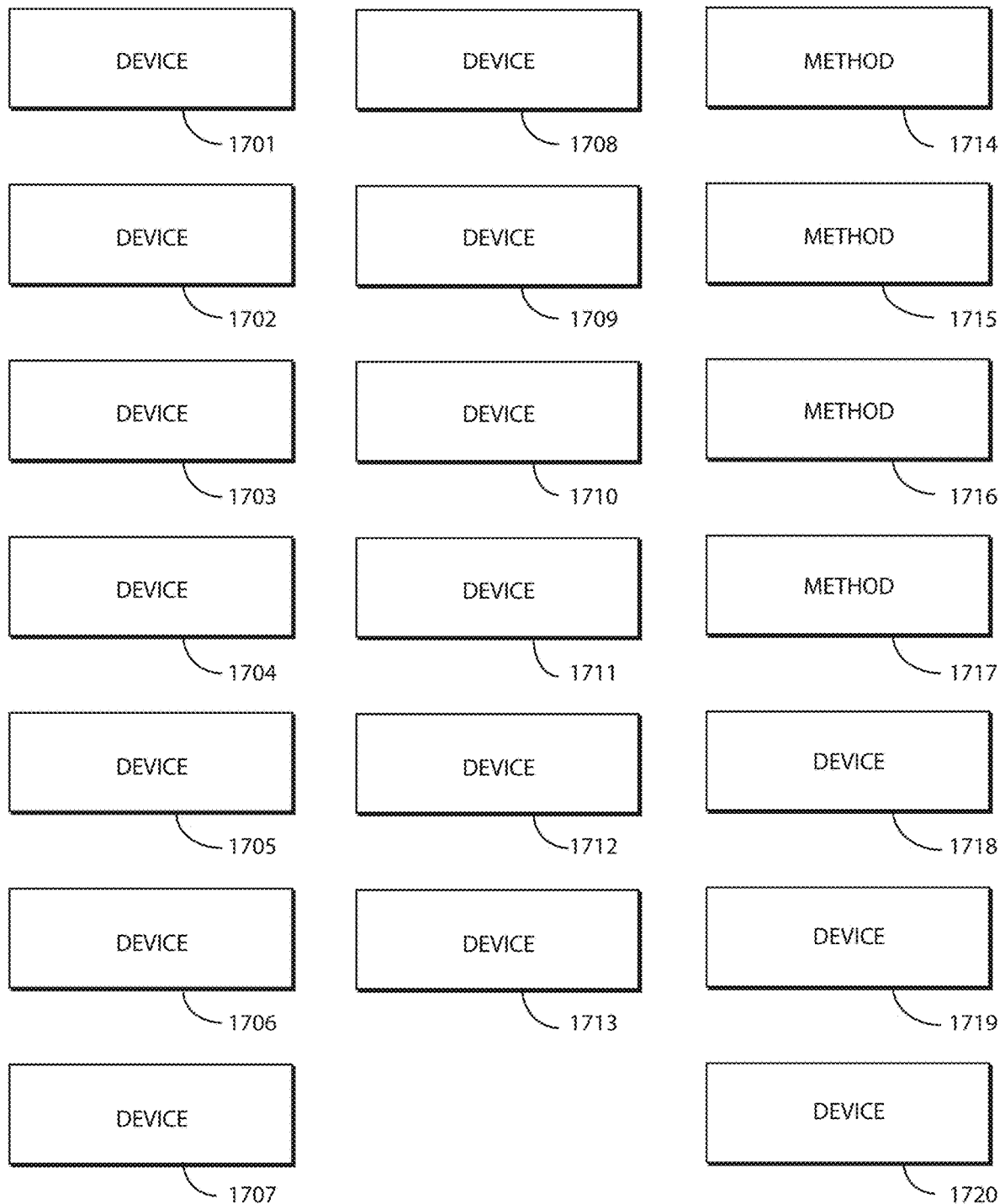
FIG. 17 illustrates one or more embodiments of the disclosure.

Turning now to FIG. 17, illustrated therein are various embodiments of the disclosure. The embodiments of FIG. 17 are shown as labeled boxes in FIG. 17 due to the fact that the individual components of these embodiments have been illustrated in detail in FIGS. 1-16, which precede FIG. 17. Accordingly, since these items have previously been illustrated and described, their repeated illustration is no longer essential for a proper understanding of these embodiments. Thus, the embodiments are shown as labeled boxes.

At 1701, a compute box comprises a communication device and one or more processors operable with the communication device. At 1701, the one or more processors, in response to the communication device being electronically in communication with a flexible content presentation companion device associated with a first user and at least one other flexible content presentation companion device associated with a second user that is different from the first user, determine a geometric configuration of each of the flexible content presentation companion device and the at least one other flexible content presentation companion device and format content for the flexible content presentation companion device and at least some other content for the at least one other flexible content presentation companion device as a function of the geometric configuration.

At 1702, each of the flexible content presentation companion device and the at least one flexible content presentation companion device of 1701 comprises a flexible display. At 1702, the geometric configuration defines a visible area of the flexible display.

At 1703, the geometric configuration of the flexible content presentation companion device and the geometric configuration of the at least one other flexible content presentation companion device of 1702 are different. At 1704, the one or more processors of 1702 generate, and transmit to the flexible content presentation companion device using the communication device, a visible display area adjustment animation when the geometric configuration of the flexible content presentation companion device changes. At 1705, the one or more processors of 1704 generate, and transmit to the at least one other flexible content presentation companion device using the communication device, at least one visible display area adjustment animation when the geometric configuration of the at least one other flexible content presentation companion device changes.

At 1706, the visible display area adjustment animation of 1705 and the at least one visible display area adjustment animation are different. At 1707, the content of 1706 and the at least some other content are different.

At 1708, the one or more processors of 1705 generate, and transmit to the flexible content presentation companion device using the communication device, a new visible display area presentation for the content when changes in the geometric configuration of the flexible content presentation companion device cease. At 1709, the one or more processors of 1708 generate, and transmit to the at least one other flexible content presentation companion device using the communication device, at least one other new visible display area presentation for the at least some other content when changes in the geometric configuration of the at least one other flexible content presentation companion device cease.

At 1710, the new visible display area presentation of 1709 for the content and the at least one other new visible display area presentation for the at least some other content are different. At 1711, the at least one flexible content presentation companion device of 1701 comprises at least two other flexible content presentation companion devices associated with different users.

At 1712, a method for a compute box comprises detecting, with a communication device from signals received by the communication device a geometric configuration of a flexible content presentation companion device defining a visible area of a flexible display carried by the flexible content presentation companion device and another geometric configuration of another flexible content presentation companion device defining another visible area of another flexible display carried by the another flexible content presentation companion device. At 1712, the method comprises rendering, by one or more processors content for presentation on the visible area of the flexible display carried by the flexible content presentation companion device and other content for presentation on the visible area of the other flexible display carried by the another flexible content presentation companion device.

At 1712, the method comprises detecting, with the communication device from other signals received by the communication device, one or both of a change in the geometric configuration of the flexible content presentation companion device and/or another change in the another geometric configuration of the another flexible content presentation companion device. At 1712, in response, the method comprises one or both of again rendering the content to create adapted content for presentation on a different visible portion of the flexible display carried by the flexible content presentation companion device created by the change in the geometric configuration of the flexible content presentation companion device and/or again rendering the other content to create another adapted content for presentation on another different visible portion of the another flexible display carried by the another flexible content presentation companion device created by the another change in the another geometric configuration of the another flexible content presentation companion device.

At 1713, the method of 1712 further comprises one or both of transmitting, with the communication device, the adapted content to the flexible content presentation companion device and/or transmitting, with the communication device, the other adapted content to the other flexible content presentation companion device. At 1713, the adapted content and the other adapted content occupy different amounts of the flexible display and the other flexible display, respectively.

At 1714, the again rendering of 1712 comprises one or both of generation of a visible display area adjustment animation for the content and/or generation of another visible display area adjustment animation for the other content. At 1715, the method of 1712 further comprises establishing, with the communication device, electronic communication with at least one non-flexible content presentation companion device and providing, by the one or more processors, computing resources for the at least one non-flexible content presentation companion device.

At 1716, both the geometric configuration of the flexible content presentation companion device of 1712 and the other geometric configuration of the other flexible content presentation companion device of 1712 are different. At 1716, the content for presentation on the visible area of the flexible display carried by the flexible content presentation companion device and the other content for presentation on the visible area of the another flexible display carried by the another flexible content presentation companion device are different.

At 1717, the geometric configuration of the flexible content presentation companion device of 1712 is substantially flat and the other geometric configuration of the other flexible content presentation companion device of 1712 is deformed.

At 1718, a compute box system comprises a compute box comprising one or more processors and a communication device. At 1718, the compute box system comprises a first flexible content presentation companion device comprising a first flexible display, electronically in communication with the communication device of the compute box, and receiving first content for presentation on a visible area defined by a geometric configuration of the first flexible content presentation companion device and a second flexible content presentation companion device comprising a second flexible display, electronically in communication with the communication device of the compute box, and receiving second content for presentation on another visible area defined by another geometric configuration of the second flexible content presentation companion device. At 1718, when the geometric configuration or the another geometric configuration changes, the one or more processors adjust a rendering of the first content or the second content, respectively, as a function of changes to the geometric configuration or the another geometric configuration.

At 1719, the one or more processors of 1718 adjust the rendering of the first content or the second content, respectively, by animating the first content or the second content, respectively. At 1720, the first content and the second content of 1718 are different and are concurrently received by the first flexible content presentation companion device and the second flexible content presentation companion device, respectively.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A compute box, comprising:
   a communication device; and
   one or more processors operable with the communication device;
   the one or more processors, in response to the communication device being electronically in communication with:
   a flexible content presentation companion device associated with a first user; and
   at least one other flexible content presentation companion device associated with a second user that is different from the first user;
   determine a geometric configuration of each of the flexible content presentation companion device and the at least one other flexible content presentation companion device; and
   format content for the flexible content presentation companion device and at least some other content for the at least one other flexible content presentation companion device as a function of the geometric configuration.

2. The compute box of claim 1, wherein:
each of the flexible content presentation companion device and the at least one other flexible content presentation companion device comprises a flexible display; and
the geometric configuration defines a visible area of the flexible display.

3. The compute box of claim 2, wherein the geometric configuration of the flexible content presentation companion device and the geometric configuration of the at least one other flexible content presentation companion device are different.

4. The compute box of claim 2, the one or more processors generating, and transmitting to the flexible content presentation companion device using the communication device, a visible display area adjustment animation when the geometric configuration of the flexible content presentation companion device changes.

5. The compute box of claim 4, the one or more processors generating, and transmitting to the at least one other flexible content presentation companion device using the communication device, at least one visible display area adjustment animation when the geometric configuration of the at least one other flexible content presentation companion device changes.

6. The compute box of claim 5, wherein the visible display area adjustment animation and the at least one visible display area adjustment animation are different.

7. The compute box of claim 6, wherein the content and the at least some other content are different.

8. The compute box of claim 5, the one or more processors generating, and transmitting to the flexible content presentation companion device using the communication device, a new visible display area presentation for the content when changes in the geometric configuration of the flexible content presentation companion device cease.

9. The compute box of claim 8, the one or more processors generating, and transmitting to the at least one other flexible content presentation companion device using the communication device, at least one other new visible display area presentation for the at least some other content when changes in the geometric configuration of the at least one other flexible content presentation companion device cease.

10. The compute box of claim 9, wherein the new visible display area presentation for the content and the at least one other new visible display area presentation for the at least some other content are different.

11. The compute box of claim 1, wherein the at least one other flexible content presentation companion device comprises at least two other flexible content presentation companion devices associated with different users.

12. A method for a compute box, the method comprising:
detecting, with a communication device from signals received by the communication device:
a geometric configuration of a flexible content presentation companion device defining a visible area of a flexible display carried by the flexible content presentation companion device; and
another geometric configuration of another flexible content presentation companion device defining another visible area of another flexible display carried by the another flexible content presentation companion device;
rendering, by one or more processors:
content for presentation on the visible area of the flexible display carried by the flexible content presentation companion device; and
other content for presentation on the visible area of the another flexible display carried by the another flexible content presentation companion device;
detecting, with the communication device from other signals received by the communication device, one or both of:
a change in the geometric configuration of the flexible content presentation companion device; and/or
another change in the another geometric configuration of the another flexible content presentation companion device; and
in response, one or both of:
again rendering the content to create adapted content for presentation on a different visible portion of the flexible display carried by the flexible content presentation companion device created by the change in the geometric configuration of the flexible content presentation companion device; and/or
again rendering the other content to create another adapted content for presentation on another different visible portion of the another flexible display carried by the another flexible content presentation companion device created by the another change in the another geometric configuration of the another flexible content presentation companion device.

13. The method of claim 12, further comprising one or both of:
transmitting, with the communication device, the adapted content to the flexible content presentation companion device; and/or
transmitting, with the communication device, the another adapted content to the another flexible content presentation companion device;
wherein the adapted content and the another adapted content occupy different amounts of the flexible display and the another flexible display, respectively.

14. The method of claim 12, wherein the again rendering comprises one or both of:
generation of a visible display area adjustment animation for the content; and/or
generation of another visible display area adjustment animation for the other content.

15. The method of claim 12, further comprising:
establishing, with the communication device, electronic communication with at least one non-flexible content presentation companion device; and
providing, by the one or more processors, computing resources for the at least one non-flexible content presentation companion device.

16. The method of claim 12, wherein both:
the geometric configuration of the flexible content presentation companion device and the another geometric configuration of the another flexible content presentation companion device are different; and
the content for presentation on the visible area of the flexible display carried by the flexible content presentation companion device and the other content for presentation on the visible area of the another flexible display carried by the another flexible content presentation companion device are different.

17. The method of claim 12, wherein the geometric configuration of the flexible content presentation companion device is substantially flat and the another geometric configuration of the another flexible content presentation companion device is deformed.

18. A compute box system, comprising:
- a compute box comprising one or more processors and a communication device;
- a first flexible content presentation companion device comprising a first flexible display, electronically in communication with the communication device of the compute box, and receiving first content for presentation on a visible area defined by a geometric configuration of the first flexible content presentation companion device; and
- a second flexible content presentation companion device comprising a second flexible display, electronically in communication with the communication device of the compute box, and receiving second content for presentation on another visible area defined by another geometric configuration of the second flexible content presentation companion device;
- wherein when the geometric configuration or the another geometric configuration changes, the one or more processors adjust a rendering of the first content or the second content, respectively, as a function of changes to the geometric configuration or the another geometric configuration.

19. The compute box system of claim 18, wherein the one or more processors adjust the rendering of the first content or the second content, respectively, by animating the first content or the second content, respectively.

20. The compute box system of claim 18, wherein the first content and the second content are different and are concurrently received by the first flexible content presentation companion device and the second flexible content presentation companion device, respectively.

* * * * *